United States Patent
Salman et al.

(10) Patent No.: US 11,313,994 B2
(45) Date of Patent: Apr. 26, 2022

(54) GEOPHYSICAL DEEP LEARNING

(71) Applicant: Schlumberger Technology Corporation, Sugar Land, TX (US)

(72) Inventors: Nader Salman, Cambridge, MA (US); Victor Aarre, Stavanger (NO); Hilde Grude Borgos, Stavanger (NO); Michael Hermann Nickel, Rogaland (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 174 days.

(21) Appl. No.: 16/484,879

(22) PCT Filed: Feb. 9, 2018

(86) PCT No.: PCT/US2018/017544
§ 371 (c)(1),
(2) Date: Aug. 9, 2019

(87) PCT Pub. No.: WO2018/148492
PCT Pub. Date: Aug. 16, 2018

(65) Prior Publication Data
US 2019/0383965 A1    Dec. 19, 2019

Related U.S. Application Data

(60) Provisional application No. 62/457,096, filed on Feb. 9, 2017.

(51) Int. Cl.
*G06N 20/00*        (2019.01)
*G01V 99/00*        (2009.01)
(Continued)

(52) U.S. Cl.
CPC ............ *G01V 99/005* (2013.01); *G01V 1/282* (2013.01); *G01V 1/30* (2013.01); *G01V 1/36* (2013.01);
(Continued)

(58) Field of Classification Search
CPC ........ G01V 99/005; G01V 1/282; G01V 1/30; G01V 1/306; G01V 1/36; G01V 1/50;
(Continued)

(56) References Cited

U.S. PATENT DOCUMENTS

| 6,374,185 B1 | 4/2002 | Taner et al. |
| 7,672,824 B2 | 3/2010 | Dutta et al. |
| 8,473,264 B2 | 6/2013 | Barnes et al. |

FOREIGN PATENT DOCUMENTS

| CN | 1625699 A | 6/2005 |
| CN | 101918864 A | 12/2010 |

(Continued)

OTHER PUBLICATIONS

Ketineni et al., Structuring an Integrative Approach for Field Development Planning Using Artificial Intelligence and Its Application to an Offshore Oilfield, Sep. 28-30, 2015, SPE Annual Technical Conference and Exhibition, Houston, Texas, 21 pp. (Year: 2015).*

(Continued)

*Primary Examiner* — Toan M Le
(74) *Attorney, Agent, or Firm* — Christopher M. Mooney

(57) ABSTRACT

A method can include selecting a type of geophysical data; selecting a type of algorithm; generating synthetic geophysical data based at least in part on the algorithm; training a deep learning framework based at least in part on the synthetic geophysical data to generate a trained deep learning framework; receiving acquired geophysical data for a geologic environment; implementing the trained deep learn- (Continued)

ing framework to generate interpretation results for the acquired geophysical data; and outputting the interpretation results.

20 Claims, 20 Drawing Sheets

(51) Int. Cl.
    *G01V 1/28*     (2006.01)
    *G01V 1/30*     (2006.01)
    *G01V 1/36*     (2006.01)
    *G01V 1/50*     (2006.01)
    *G01V 3/08*     (2006.01)
    *G01V 3/18*     (2006.01)
    *G01V 3/38*     (2006.01)

(52) U.S. Cl.
    CPC ............ *G01V 1/50* (2013.01); *G01V 3/083* (2013.01); *G01V 3/18* (2013.01); *G01V 3/38* (2013.01); *G06N 20/00* (2019.01); *G01V 1/301* (2013.01); *G01V 2003/086* (2013.01); *G01V 2210/56* (2013.01); *G01V 2210/614* (2013.01); *G01V 2210/6163* (2013.01); *G01V 2210/6169* (2013.01); *G01V 2210/64* (2013.01)

(58) Field of Classification Search
    CPC . G01V 3/083; G01V 3/18; G01V 3/38; G01V 11/00; G01V 2003/086; G01V 2210/614; G01V 2210/6163; G01V 2210/6169; G01V 2210/61–62; G01V 2210/50; G06N 20/00; G06N 3/04; G06N 3/08
    See application file for complete search history.

(56) References Cited

FOREIGN PATENT DOCUMENTS

| | | |
|---|---|---|
| CN | 102759757 A | 10/2012 |
| CN | 105388512 A | 3/2016 |
| WO | 2019040288 A1 | 2/2019 |

OTHER PUBLICATIONS

Astratti et al., Seismic to Simulation Fracture Characterization of a Green Carbonate Reservoir in Presence of Large Uncertainties, Nov. 1-4, 2010, Abu Dhabi International Petroleum Exhibition & Conference, Abu Dhabi, UAE, 10 pp. (Year: 2010).*
One_Petro_Search_Results, Mar. 17, 2021, 10 pp. (Year: 2021).*
Korjani et al., Reservoir Characterization Using Fuzzy Kriging and Deep Learning Neural Networks, Sep. 26-28, 2016, SPE Annual Technical Conference and Exhibition, Dubai, UAE, 15 pp. (Year: 2016).*
Balz, et al., "Reservoir Characterisation Using Neural Networks Controlled by Petrophysical and Seismic Modelling," SEG San Antonio 2007 Annual Meeting, Jun. 11, 1999, pp. 1-4.
Essenreiter, et al., "Elimination of multiple reflections in marine seismograms using neural networks," Neural Networks, 1997, International Conference on Houston, TX USA Jun. 9-12, 1997, New York, NY, USA, IEEE, US, vol. 4, Jun. 9, 1997, pp. 2157-2161.
Neyamadpour, et al., "3D inversion of DC data using artificial neural networks," Studia Geophysica et Geodaetica, Kluwer Academic Publishers-Plenum Publishers, NE, vol. 54, No. 3, Sep. 25, 2010, pp. 465-485.
Roth, et al., "Neural networks and inversion of seismic data," Journal of Geophysical Research, vol. 99, No. B4, Apr. 10, 1994, pp. 6753-6768.
Yildirim, et al., "Estimation of seismic quality factor: Artificial neural networks and current approaches," Journal of Applied Geophysics, Elsevier, Amsterdam, NL, vol. 136, Nov. 11, 2016, pp. 269-278.
Zhang, et al., "Machine-learning Based Automated Fault Detection in Seismic Traces," SEG San Antonio 2007 Annual Meeting, 19, Jun. 2014, pp. 1-5.
International Search Report and Written Opinion for the equivalent International patent application PCT/US2018/017544 dated May 28, 2018.
International Preliminary Report on Patentability for the equivalent International patent application PCT/US2018/017544 dated Aug. 22, 2019.
SEG Wiki: "Frequency Filtering" https://wiki.seg.org/wiki/Frequency_filtering, 2016 (3 pages).
NTNU and Schlumberger AS, Welcome to A3Mark, http://a3mark.idi.ntnu.no/, 2016, accessed 2017 (1 page).
Schlumberger, Northern Delaware Basin, 2014 (2 pages).
DI Blog, The Midland Basin vs. the Delaware Basin—Understanding the Permian, Oct. 28, 2014 (8 pages).
Branston et al., Imaging below shallow gas with full azimuth acquisition: a case study. SEG Las Vegas 2012 Annual Meeting, 2012 (5 pages).
NTNU and Schlumberger AS, A3Mark: Seismic Attributes Benchmark, Welcome to A3Mark, http://a3mark.idi.ntnu.no/, 2016, accessed 2021 (2 pages).
First Chinese Office Action issued in Chinese Patent Application No. 2018800203553 dated Mar. 2, 2021, 6 pages.
First Chinese Office Action issued in Chinese Patent Application No. 2018800203553 dated Mar. 2, 2021, 8 pages (English translation).
Communication pursuant to Article 94(3) issued in European Patent Application No. 18707192.3 dated Oct. 4, 2021, 19 pages.
Second Chinese Office Action issued in Chinese Patent Application No. 2018800203553 dated Oct. 27, 2021, 13 pages with partial English Translation.

* cited by examiner

Technique 410

Technique 470

Map 1600

US 11,313,994 B2

GEOPHYSICAL DEEP LEARNING

RELATED APPLICATION

This application claims the benefit of and priority to a U.S. Provisional Application having Ser. No. 62/457,096, filed 9 Feb. 2017, which is incorporated by reference herein.

BACKGROUND

Geophysical data are acquired using various types of sensors and processes. Geophysical data can be log data as acquired via equipment disposed in one or more locations where one of the locations includes a bore location (e.g., consider wireline, logging while drilling, etc.). Geophysical data can be seismic data, for example, as acquired via reflection seismology equipment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to acquisition, processing and/or control of data such as, for example, one or more of log data and seismic data.

SUMMARY

A method can include selecting a type of geophysical data; selecting a type of algorithm; generating synthetic geophysical data based at least in part on the algorithm; training a deep learning framework based at least in part on the synthetic geophysical data to generate a trained deep learning framework; receiving acquired geophysical data for a geologic environment; implementing the trained deep learning framework to generate interpretation results for the acquired geophysical data; and outputting the interpretation results. A system can include a processor; memory operatively coupled to the processor; and processor-executable instructions stored in the memory to instruct the system to: select a type of geophysical data; select a type of algorithm; generate synthetic geophysical data based at least in part on the algorithm; train a deep learning framework based at least in part on the synthetic geophysical data to generate a trained deep learning framework; receive acquired geophysical data for a geologic environment; implement the trained deep learning framework to generate interpretation results for the acquired geophysical data; and output the interpretation results. One or more computer-readable storage media can include processor-executable instructions to instruct a computing system to: select a type of geophysical data; select a type of algorithm; generate synthetic geophysical data based at least in part on the algorithm; train a deep learning framework based at least in part on the synthetic geophysical data to generate a trained deep learning framework; receive acquired geophysical data for a geologic environment; implement the trained deep learning framework to generate interpretation results for the acquired geophysical data; and output the interpretation results. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
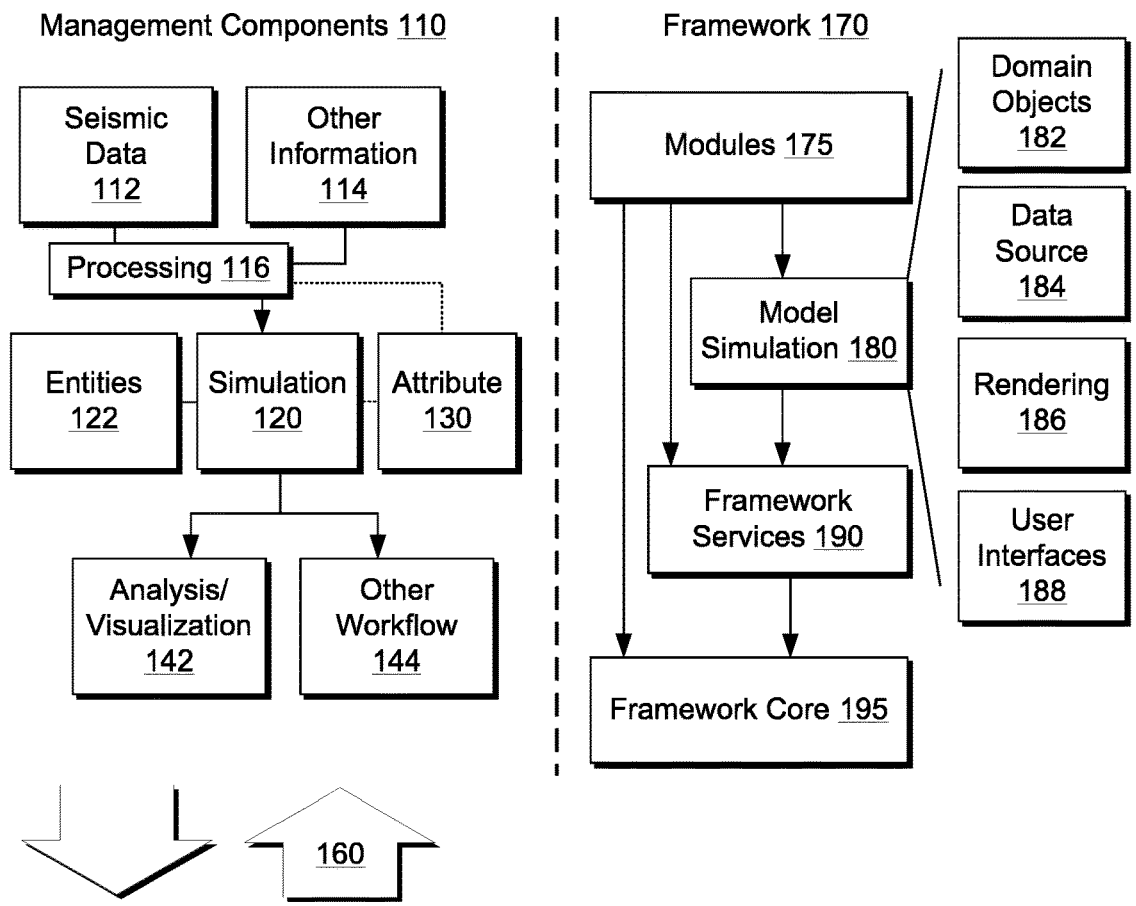
FIG. 1 illustrates an example of a system and an example of a geologic environment.
Figure 1:
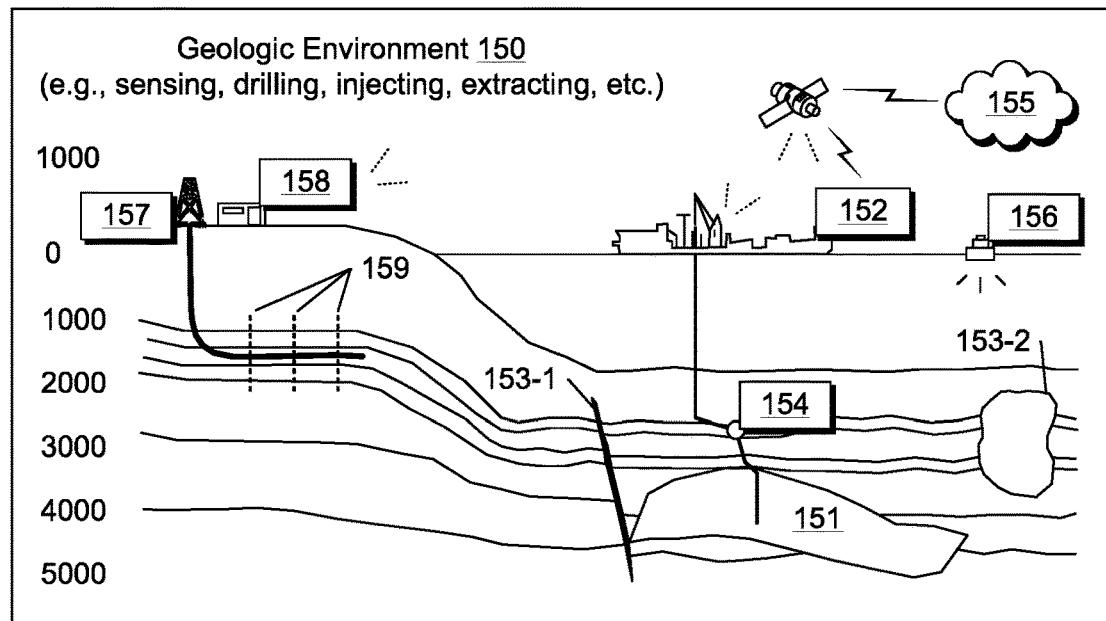

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a subsurface environment may be understood via data acquisition and analysis. Such processes can be part of a workflow that can include making decisions that are based at least in part on data. For example, a decision may be a control decision that is implemented by equipment (e.g., a controller, etc.). As an example, a control system can include one or more processors and memory accessible by at least one of the processors, and one or more interfaces. In such an example, the control system can issue control signals via at least one of the one or more interfaces (e.g., consider wired and/or wireless transmission of control signals).

As an example, data acquired and analyzed can be or include one or more types of geophysical data. As to some examples of techniques that may be implemented to acquire geophysical data, consider seismic techniques (e.g., reflection seismology, seismic refraction, and seismic tomography), seismoelectrical techniques, geodesy and gravity techniques (e.g., gravimetry and gravity gradiometry), magnetic techniques (e.g., aeromagnetic surveys and magnetometers), electrical techniques (e.g., electrical resistivity tomography, induced polarization, spontaneous potential and control source electromagnetic (CSEM), etc.), electromagnetic techniques (e.g., magnetotellurics, ground penetrating radar and transient/time-domain electromagnetics, magnetic resonance sounding (MRS)), borehole geophysics (e.g., well logging, etc.), remote sensing techniques (e.g., hyperspectral, etc.), etc.

As mentioned, data can be log data (e.g., a type of geophysical data such as bore log or well log data). A logging process can include measuring one or more formation properties via one or more electrically powered instruments. Such measurements can be in the form of data, which can be analog and/or digital data. As an example, an instrument (e.g., a piece or pieces of equipment) can acquire signals (e.g., via one or more sensors, etc.) that may be in analog and/or digital form where, for example, analog signals may be converted to digital signals via one or more analog-to-digital converters (ADC). As an example, signals, data, processed signal information, processed data, etc., may be transmitted via one or more interfaces to be received by one or more pieces of equipment.

Logging can generate one or more logs. As an example, one or more logs may be utilized to computationally estimate properties and make decisions about a drilling operation, a production operation or other type of operation associated with a geologic environment.

Logging may include acquiring measurements as to one or more of electrical properties (e.g., resistivity and conductivity at various frequencies), sonic properties, active and passive nuclear measurements, dimensional measurements of the wellbore, formation fluid sampling, formation pressure measurement, and wireline-conveyed sidewall coring tool measurements.

For wireline measurements, a logging tool may be lowered into an open bore on a multiple conductor, contrahelically armored wireline cable. Once a tool string has reached the bottom of an interval of interest, measurements can be taken on the way out of the bore. Such an approach can attempt to maintain tension on the cable (which may stretch) as constant as possible for depth correlation purposes. In some environments, such as certain hostile environments in which the tool electronics might not survive the downhole temperatures for long enough to allow the tool to be lowered to the bottom of the hole and measurements to be recorded while pulling the tool up the hole, down log measurements might be conducted on the way into the wellbore, and repeated on the way out (e.g., if practicable). Some types of wireline measurements are recorded continuously while a tool is moving. Certain fluid sampling and pressure-measuring tools can operate at locations where the tool is stopped. Logging while drilling (LWD) tools may take measurements via one or more self-contained tools, which may be part of a drillstring (e.g., near the bottom of the bottom hole assembly (BHA)). Such LWD measurements may be recorded downward (e.g., as a well is deepened) rather than upward from the bottom of the hole.

Various types of data may be subjected to a process referred to as interpretation, which can be machine-based, human-based or a combination of machine-based and human-based. Interpretation aims to generate results (e.g., interpretation results). Results may be quantitative and/or qualitative. As an example, results may be numeric as to a property value, as to a location, etc. For example, results may provide a value for a property such as a lithological property (e.g., a type of rock, a type of fluid, a composition of material, etc.). As to location, results may provide a dimension, a starting point, an ending point, an area, a volume, etc., as to one or more types of rock, fluid, etc.

As an example, seismology may be used to acquire data (e.g., a type of geophysical data). In such an example, the data may be subject to interpretation. For example, consider seismic interpretation as a process that involves examining seismic data (e.g., with respect to location and time or depth) to identify one or more types of subsurface structures (e.g., facies, horizons, faults, geobodies, etc.). Seismic data may optionally be interpreted with other data such as, for example, log data. As an example, a process may include receiving data and generating a model based at least in part on such data.

As an example, a process may include determining one or more seismic attributes. A seismic attribute may be considered, for example, a way to describe, quantify, etc., characteristic content of seismic data. As an example, a quantified characteristic may be computed, measured, etc., from seismic data. As an example, a framework may include processor-executable instructions stored in memory to determine one or more seismic attributes. Seismic attributes may optionally be classified, for example, as volume attributes or surface attributes or one-dimensional attributes. A seismic attribute can be a numeric value that is based at least in part on processing data that includes seismic data.

A seismic interpretation may be performed using displayable information, for example, by rendering information to a display device, a projection device, a printing device, etc. As an example, one or more color schemes (e.g., optionally including black and white or greyscale) may be referenced for displayable information to enhance visual examination of the displayable information. Where the human eye will be used or is used for viewing displayable information, a display scheme may be selected to enhance interpretation.

As an example, seismic interpretation may be performed using seismic to simulation software such as the PETREL® seismic to simulation software framework (Schlumberger Limited, Houston, Tex.), which includes various features to perform attribute analyses (e.g., with respect to a 3D seismic cube, a 2D seismic line, etc.). While the PETREL® seismic to simulation software framework is mentioned, other types of software, frameworks, etc., may be employed. As an example, a model built using a framework may be utilized by a simulator, for example, consider a reservoir simulator such as the ECLIPSE® simulator (Schlumberger Limited, Houston, Tex.), the INTERSECT® simulator (Schlumberger Limited, Houston, Tex.), etc.

As an example, a survey (e.g., a geophysical survey) may aim to understand subsurface structure (e.g., structural features) of a region such as a basin, which can be a sedimentary basin that includes one or more reservoirs that include one or more resources (e.g., hydrocarbons, etc.). As an example, "pay" may be a reservoir or portion of a reservoir that includes economically producible hydrocarbons (e.g., pay sand, pay zone, etc.). The overall interval in which pay sections occur may be referred to as gross pay; where, for example, smaller portions of the gross pay that meet local criteria for pay (e.g., such as minimum porosity, permeability and hydrocarbon saturation) are referred to as net pay. As an example, a reservoir simulator may assess a geologic environment that includes at least a portion of a reservoir (e.g., or reservoirs) as to its physical properties that may be used to estimate pay. In such an example, parameters as to physical properties such as porosity, permeability and saturation may be included within equations that can model a geologic environment. As an example, such properties may be initialized prior to performing a simulation. In such an example, values for the properties may affect simulation results, convergence of a simulation solution, etc. As an example, a method can include adjusting values prior to performing a simulation, which may, in turn, reduce computation time, enhance convergence rate, allow for output of a converged solution, etc.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator, the INTERSECT® reservoir simulator, etc. As an example, a simulation component, a simulator, etc. may optionally include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework. The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh. As an example, a mesh may be a grid. Such constructs (e.g., meshes or grids) may be defined by nodes, cells, intervals, segments, etc. As mentioned, a so-called meshless approach may be implemented, for example, based on points such as in a point cloud, etc.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, sets of instructions, etc.).

As an example, a method can include performing data augmentation (or supplementation) for deep learning. In such an example, deep learning can include training a neural network to generate a trained neural network. Such a trained neural network may be utilized to perform one or more types of interpretations. For example, a method can include acquiring data and processing the acquired data via a trained neural network to output interpretation results. As an example, an interpretation can be a recognition of a structural feature within a domain of data such as a geophysical data domain (e.g., a spatial domain, a time domain, a frequency domain, etc.). As an example, an interpretation can be a classification as to one or more types of structural features. As an example, an interpretation can be an indication that some type of structural feature is likely to exist in a domain but that the type may be unrecognizable and/or unclassifiable (e.g., to a desired degree of certainty, etc.). Such a type of structural feature may be subjected to further processing, which may occur automatically or semi-automatically responsive to output from a trained deep learning framework (e.g., consider output to the PETREL® framework for further interpretation, etc.).

Deep learning (also known as deep structured learning or hierarchical learning) is part of a broader family of machine learning (ML) methods based on learning data representations, as opposed to task-specific algorithms. Learning may be supervised, semi-supervised or unsupervised.

Some representations are loosely based on interpretation of information processing and communication patterns in a biological nervous system, such as neural coding that attempts to define a relationship between various stimuli and associated neuronal responses in the brain.

Deep learning architectures can include, for example, one or more of deep neural networks, deep belief networks and recurrent neural networks.

Deep learning finds use in image recognition such as, for example, facial recognition of human faces. Deep learning also finds use in inverse image problems such as denoising images, super-resolution processing of images, and inpainting of images. Such deep learning approach train on one or more image datasets.

An image dataset can be a set of pixel images where a pixel image is an array (or vector) of pixel values. For example, a pixel image may be of a pixel depth of 8 bits such that each pixel in the image has a value in a range from 0 to 255 (e.g., $2^8$). A dataset can be raw pixel images or processed pixel images. As to processed pixel images, processing can utilize filters that can be applied to a 2D pixel image.

Image filtering is a technique for modifying or enhancing an image. For example, an image can be filtered to emphasize certain features or remove other features. Image processing operations implemented with filtering include smoothing, sharpening, and edge enhancement.

Image filtering can be a neighborhood operation, in which a value of a given pixel in an output image is determined by applying an algorithm to values of pixels in a neighborhood of the corresponding input pixel. A pixel's neighborhood is some set of pixels, defined by their locations relative to that pixel. Linear image filtering is filtering in which the value of an output pixel is a linear combination of the values of the pixels in the input pixel's neighborhood.

Linear filtering of an image can be accomplished through an operation called convolution. Convolution is a neighborhood operation in which each output pixel is the weighted sum of neighboring input pixels. The matrix of weights is called the convolution kernel, also known as the filter. A convolution kernel is a correlation kernel that has been rotated 180 degrees.

The operation called correlation is closely related to convolution. In correlation, the value of an output pixel is also computed as a weighted sum of neighboring pixels. The difference is that the matrix of weights, in this case called the correlation kernel, is not rotated during the computation.

While image filtering of 2D pixel images of log and/or seismic data may be performed, such filtering does not operate at the level of the associated acquisition techniques utilized to acquire such log and/or seismic data, with the exception of direct photographic imaging techniques where an imaging sensor such as a CCD array or the like acquires an array directly (e.g., via a lens, etc.).

As an example, a method can include selecting an algorithm from a plurality of algorithms and applying the selected algorithm to generate synthetic data where such synthetic data can optionally be based at least in part on acquired field data (e.g., "real" data), which can be or include geophysical data. In such an example, an algorithm may augment field data (e.g., supplement field data). Such a method may be utilized to generate data suitable for inclusion in a deep learning dataset that can train a deep learning system (e.g., a deep learning framework).

As an example, an algorithm can be a physics-based algorithm that is tied to one or more physical properties of a geologic environment, which may be one or more rock properties and/or one or more fluid properties. As an example, rather than merely placing an object (e.g., a geobody, an interface, etc.) in a seismic image, an algorithm can include generating seismic trace data (e.g., as time series data with respect to one or more spatial dimensions) as associated with an object in a geologic environment. In such an example, deep learning applied to seismic trace data can operate at the level of the time series (e.g., amplitude with respect to time, etc.), which, for example, may aim to "recognize" the existence of the object based on characteristics of an input seismic trace (e.g., input seismic trace data). Such an approach may be defined as operating at least in part in a time domain, noting that one or more other domains may be utilized (e.g., a depth domain where time of a trace is related to depth, a frequency domain, etc.). As an example, one or more analyses may utilize a Fourier technique (e.g., Fourier transform, inverse Fourier transform, etc.). As an example, a Fourier transform (FT) may be utilized to decomposes a function of time (e.g., a signal, a trace, etc.) into frequencies (e.g., from a time domain to a frequency domain) and an inverse FT may be utilized perform a reverse (e.g., inverse) operation.

As an example, rather than implementing image filtering techniques as utilized in 2D pixel images, a method can include generating a dataset (e.g., augmented, supplemented, expanded, etc.), via one or more algorithms applied to time series data such as a 1D seismic trace, which may be a series of amplitude values for a series of time values. A seismic trace may be defined, as an example, as seismic data recorded for one channel of an acquisition system (e.g., consider survey geometries specified at least in part by a channel parameter that may be a value that indicates how many channels were utilized to acquire data). A seismic trace can be acquired such that the seismic trace represents the response of an elastic wavefield to velocity and density contrasts across interfaces of layers of material (e.g., rock, sediment, fluid, etc.) as energy travels from a source through the subsurface to a receiver or receiver array.

As an example, energy received may be discretized by an analog-to-digital converter (ADC) that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

As to seismic acquisition geometry of a seismic survey, a 2D grid can be considered to be dense where line spacing is less than about 400 m. As to 3D acquisition of seismic data, such an approach may be utilized to uncover (e.g., via interpretation) true structural dip (2D may give apparent dip), enhanced stratigraphic information, a map view of reservoir properties, enhanced areal mapping of fault patterns and connections and delineation of reservoir blocks, and enhanced lateral resolution (e.g., 2D may exhibit detrimental cross-line smearing or Fresnel zone issues).

A 3D seismic dataset can be referred to as a cube or volume of data; a 2D seismic data set can be referred to as a panel of data. To interpret 3D data, processing can be on the "interior" of the cube, which is a computation process because massive amounts of data are involved. For example, a 3D dataset can range in size from a few tens of megabytes to several gigabytes.

A 3D seismic data volume can include a vertical axis that is two-way traveltime (TWT) rather than depth and can include data values that are seismic amplitudes values. Such data may be defined at least in part with respect to a time axis where a trace may be a data vector of values with respect to time.

Acquired field data may be formatted according to one or more formats. For example, consider a well data format AAPG-B, log curve formats LAS or LIS-II, seismic trace data format SEGY, shotpoint locations data formats SEGP1 or UKOOA and wellsite data format WITS.

As to SEGY, which may be referred to as SEG-Y or SEG Y, is a file format developed by the Society of Exploration Geophysicists (SEG) for storing geophysical data. It is an open standard, and is controlled by the SEG Technical Standards Committee, a non-profit organization. The format was originally developed in 1973 to store single-line seismic reflection digital data on magnetic tapes. The most recent revision of the SEG-Y format was published in 2017, named the rev 2.0 specification and includes certain legacies of the original format (referred as rev 0), such as an optional SEG-Y tape label, the main 3200 byte textual EBCDIC character encoded tape header and a 400 byte binary header.

The AAPG Computer Applications Committee has proposed the AAPG-B data exchange format for general purpose data transfers among computer systems, applications software, and companies. For log curves, the Schlumberger LIS (log information standard) has become a de facto standard, and extensions to it have been proposed. Another log data format called LAS, for log ASCII standard, has been proposed by the Canadian Well Logging Society. The UKOOA format is from the United Kingdom Offshore Operators Association. WITS is a format for transferring wellsite data (wellsite information transfer standard) as proposed by the International Association of Drilling Contractors (IADC).

A computational system may include or may provide access to a relational database management system (RDBMS). As an example, a query language such as SQL (Structured Query Language) may be utilized.

As mentioned, deep learning in 2D image analysis can involve generation of synthetic datasets where the 2D image data (e.g., pixel data) is directly synthesized, augmented, etc. As described above, geophysical data differs where it is sensed via physical processes, which can include temporal processes such as time series data. Such time series data can be wave data that includes information as to one or more waves (e.g., a wavefield or wavefields). In contrast, a CCD array of a camera captures discrete 2D images where a series of 2D images are referred to as video (discrete 2D pixel images captured at individual instances in time with respect to time).

As an example, a computational framework can be directed to applications in the oil industry for generation of realistic seismic data that can be used for deep learning based on the smart augmentation of existing seismic data.

As an example, a workflow that implements such a computational framework can interactively create and navigate through semi-synthetics seismic cubes using a graphical user interface. Such semi-synthetic seismic data creation can be driven by a set of morphing operations (e.g., algorithms) which are particularly suitable for geoscience data (e.g., log and seismic). As an example, as to seismic data, a framework can be used to multiply a limited collection of existing training data into one or more sets of semi-synthetic training data collections.

Machine Learning (ML) and Artificial Intelligence (AI) algorithms demand substantial amounts of existing training data (e.g., "experience") to train a system (e.g., a framework). Such training datasets can be in the form of pairs: individual input image plus a class label (ground truth) for the input image. In the realm of the geosciences, as data acquisition can be resource intensive (e.g., drilling, streaming, setting up equipment over a large survey area, etc.), there tends to be an insufficiency of geoscience data to efficiently learn/train existing AI algorithms to deliver solutions in the geoscience domain (see, e.g., FIG. 16 for an example of geophysical surveys that may be available for a particular area).

As mentioned, for 2D pixel image analysis, filtering or other generic image morphing operations (e.g., mirroring, rotation, scaling, etc.) can be utilized to generate a multitude of new possible synthetic realizations based on a limited set of original labeled data sets. As to data in the geosciences, while such operations (e.g., algorithms) may be utilized, a computation framework can include a plurality of algorithms that can be utilized to perform operations that are physics-based and directed to acquisition and/or data types (e.g., time series data, etc.).

As an example, one or more computational tools such as the TensorFlow tools may be utilized. TensorFlow tools are collected in a library for dataflow programming across a range of tasks involving symbolic math library, machine learning applications (e.g., neural networks). In the realm of 2D image analysis, the TensorFlow library of algorithms for AI is directed to problems related to image classification and segmentation; noting that the TensorFlow library does include some algorithms for voice recognition. Such image and voice algorithms include: mirroring, rotation, scaling, blurring, edge enhancement, automatic gain control, etc. As to a seismic dataset augmentation, a vertical flip as to geology sorted in a sequence of layers where character of seismic images changes with depth, would generate inconsistent training information. As such, the vertical flip algorithm as utilized in 2D pixel images provides little to no practical result for seismic data.

As an example, a computational framework can include a set of algorithmic tools that can consume a seismic cube (3D data) as input as well as, for example, meta information (e.g., fault, horizon, salt interpretations, etc.), and generate a new realistic seismic cube based on one or more operations of one or more of the algorithmic tools. Such output may preserve (e.g., make consistent) meta data for machine learning purposes. In other words, labels can be manipulated equivalently. As an example, when the underlying image is unchanged the labels can remain unchanged; whereas, if an underlying image is changed, the labels change too.

As an example, a framework may utilize one or more of a plurality of algorithm that may be organized in one or more libraries (e.g., computational tool libraries, etc.). Some examples of algorithms include: frequency filtering; perturbation of bandwidth (e.g., locally, etc.); forward modeling of overburden and/or illumination effects; generation and/or addition of coherent noise (e.g., synthetic or a ghost or noise extracted from another image, etc.); warping of a seismic image while maintaining a label or labels (e.g., consider compaction warp, expansion warping, etc.); generating and/or adding (e.g., adding back) residual multiples; adding synthetic faulting (e.g., draw of one or more random lines and deforming, repeating, etc.); performing palinspastic and/or structural restoration on one or more sets of data; applying reverse deformation from one or more other sets of data; an algorithmic tool that applies geo-mechanical faulting of one or more models as may be involved in geological process modeling (e.g., for sediment deposition, etc.), for example, before synthetic seismic generation; time-lapse differencing (e.g., residual generation) and adding to one or more other sets of data; randomly re-assign residuals to vintages; fluid-flow deforming, in particular vertical morphing, to emulate perturbations in the underlying velocity model; Monte-Carlo sampling of seismic data and/or a velocity model, which can be linked to labels where labels may be maintained where velocities do not change; processing and interpreting existing data, building labels, perturbing a model and labels, and generate synthetic data as modeled (e.g., via wave equation) and image; perturbing an acquisition geometry (e.g., or other acquisition parameter(s)) and simulating seismic with one or more perturbed geometries; generating synthetic data using real data as base and perturbing a derived subsurface model through warping and/or changes of elastic properties; utilization of one or more physical laws and/or approximations (e.g., ratio between lateral and vertical extent of faults), etc.; application of one or more power laws to which fault systems may adhere where use may be in modeling of a fault network where the model is more realistic than use of synthetic planes or curved surfaces; object modeling for generating multiple realizations of an underground region, for example, to generate synthetic seismic and labels; and extracting random 2D slices through a 3D volume (e.g., vertical 2D slices, with some dips up to some moderate angle, etc.).

As to generating realizations, as an example, the PETREL® framework may be utilized for facies modeling, which can find use for populating geocellular grids with discrete property values for geological characterization of a reservoir, etc. Such an approach allows for seismic-driven modeling in which probabilities can be used in several different ways to help create a realistic representation of the depositional facies or lithologies.

As an example, well log data and point attribute data may be upscaled into one or more geocellular grids. In such an example, properties can be distributed into a remaining 3D grid volume (e.g., via one or more of a variety of algorithms). As an example, one or more structural grids may be utilized to model depositional properties more accurately using a depospace concept.

As an example, one or more algorithms can provide for deterministic modeling. For example, consider indicator kriging (e.g., a pixel-based method for producing facies models based on kriging probabilities). As an example, a framework can allow for interactive editing, for example, to draw, edit, etc., facies models (e.g., via geological brushes for more realistic depositional environment design). As an example, one or more algorithms can provide for stochastic modeling (e.g., object modeling, sequential indicator simulation, truncated Gaussian simulation, or multipoint statistics). As an example, a method can include generating one or more dynamic quality assurance maps. As an example, such quality assurance may optionally be based at least in part on output from a trained deep learning framework.

Various operations as explained for 2D data may be applicable for 3D and/or 4D data. As an example, rotations, flippings, scalings, etc., can be performed along an axis/direction in one or more dimensions.

As an example, a method can include generating a library of data for purposes of training one or more deep learning systems that can include construction of data with associated suitable labels.

Figure 2:
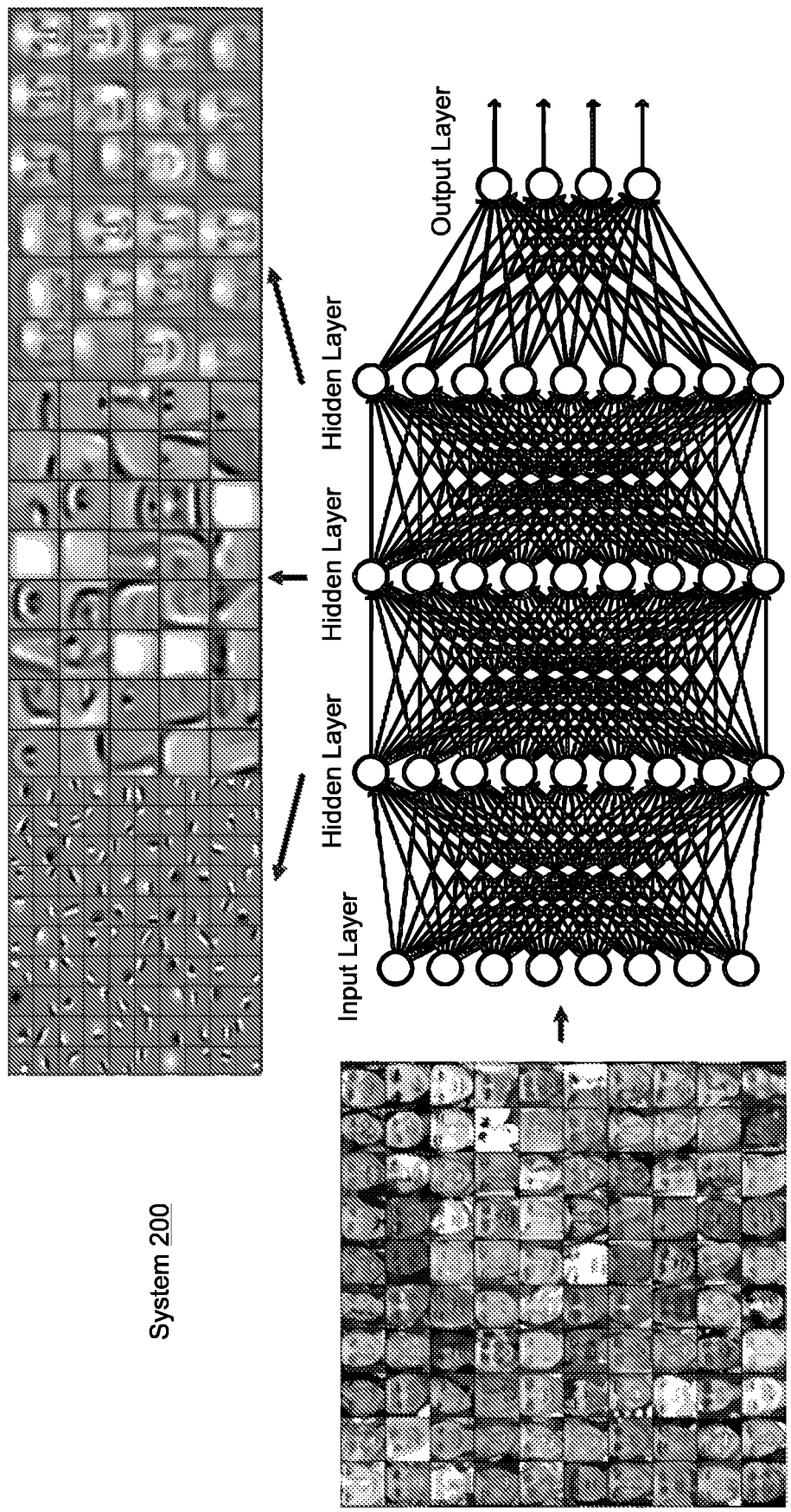
FIG. 2 illustrates an example of a deep learning system.

FIG. 2 shows an example of a system 200 (e.g., a deep learning framework) that includes a deep neural network (DNN) applied to computer vision. As shown, the system 200 can receive information via an input layer, analyze information via hidden layers and output information via an output layer. The information received at the input layer can be images such as facial images that are composed of pixels, which may be in a color space (e.g., RGB, grayscale, etc.).

The system 200 may learn (e.g., be trained) in one or more manners. Learning may be deep learning. As an example, learning can include unsupervised learning, reinforcement learning, supervised learning, semi-supervised learning, etc.

Deep learning can be applied to tasks where a basic unit, a single pixel, a single frequency, or a single word/character may have a relatively small amount of meaning in and of itself but where a combination of units has a relatively larger amount of meaning. As an example, a combination of units may be assessed as to individual values of the units, which may be collectively useful. As an example, a method can include deep learning of useful combinations of values without human intervention. For example, consider deep learning's ability to learn features from data of a dataset of handwritten digits. In such an example, when presented with tens of thousands of handwritten digits, a deep neural network can learn that it is useful to look for loops and lines when trying to classify the digits.

Deep learning can be implemented using one or more techniques or technologies, such as, for example, an optimizer, stochastic gradient descent, unsupervised data pre-training of models to automate feature extraction, transfer functions, large data set(s) size, multiple processors (e.g., GPUs and/or CPUs) to accommodate considerable computational costs incurred by deep neural network models combined with large datasets, etc.

As an example, each successive layer in a neural network can utilize features from a previous layer to learn more complex features. Consider an example, with reference to the system 200 of FIG. 2, an approach where, at the lowest level, the neural network fixates on patterns of local contrast. A next layer can then use those patterns of local contrast to fixate on data that resemble eyes, noses, and mouths as facial features. Another subsequent layer can (e.g., a top layer) can then apply those facial features to face templates. In such an example, a deep neural network is capable of composing features of increasing complexity in each of its successive layers.

Thus, the system 200 can perform automated learning of data representations and features. Such an application of deep neural networks may include models that can learn useful hierarchical representations of images, audio and written language. For example, consider these learned feature hierarchies in these domains can be construed as:

Image recognition: Pixel→edge→texton→motif→part→object

Text: Character→word→word group→clause→sentence

Speech: Sample→spectral band→sound phone→phoneme→word

As an example, for a geophysical deep learning framework, a hierarchy may be established based on one or more aspects of geophysical data. For example, where a trace is considered, alone or in combination with neighboring traces, trace(s)→one or more structural features. As mentioned, a trace may be represented with respect to time (e.g., travel time, etc.) and be amplitude data representative of seismic energy that passes through one or more materials, that reflects at one or more interfaces, that is attenuated in part by passing through one or more materials, etc. As such, a trace or traces can differ from the foregoing reference to speech, where the speech is intended to generate a word. For example, a person speaking expresses a thought through speech using the human body as a sound generator to generate waves that have the sole purpose of speech production. In contrast, for reflection seismology, seismic energy is utilized to probe an unknown region where the region is the subject of study. In speech recognition, a library of training data is readily generated by a speaker or speakers, which is facile compared to generation of training data for interpretation of geophysical data such as reflection seismology data. Humans may also generate sound for purposes of human echolocation, which is an ability of humans to detect objects in their environment by sensing echoes from those objects, by actively creating sounds—for example, by tapping their canes, lightly stomping their foot, snapping their fingers, or making clicking noises with their mouths—people trained to orient by echolocation can interpret the sound waves that pass through air and are reflected by nearby objects (e.g., line-of-sight), to identify location, size, etc.

Figure 3:
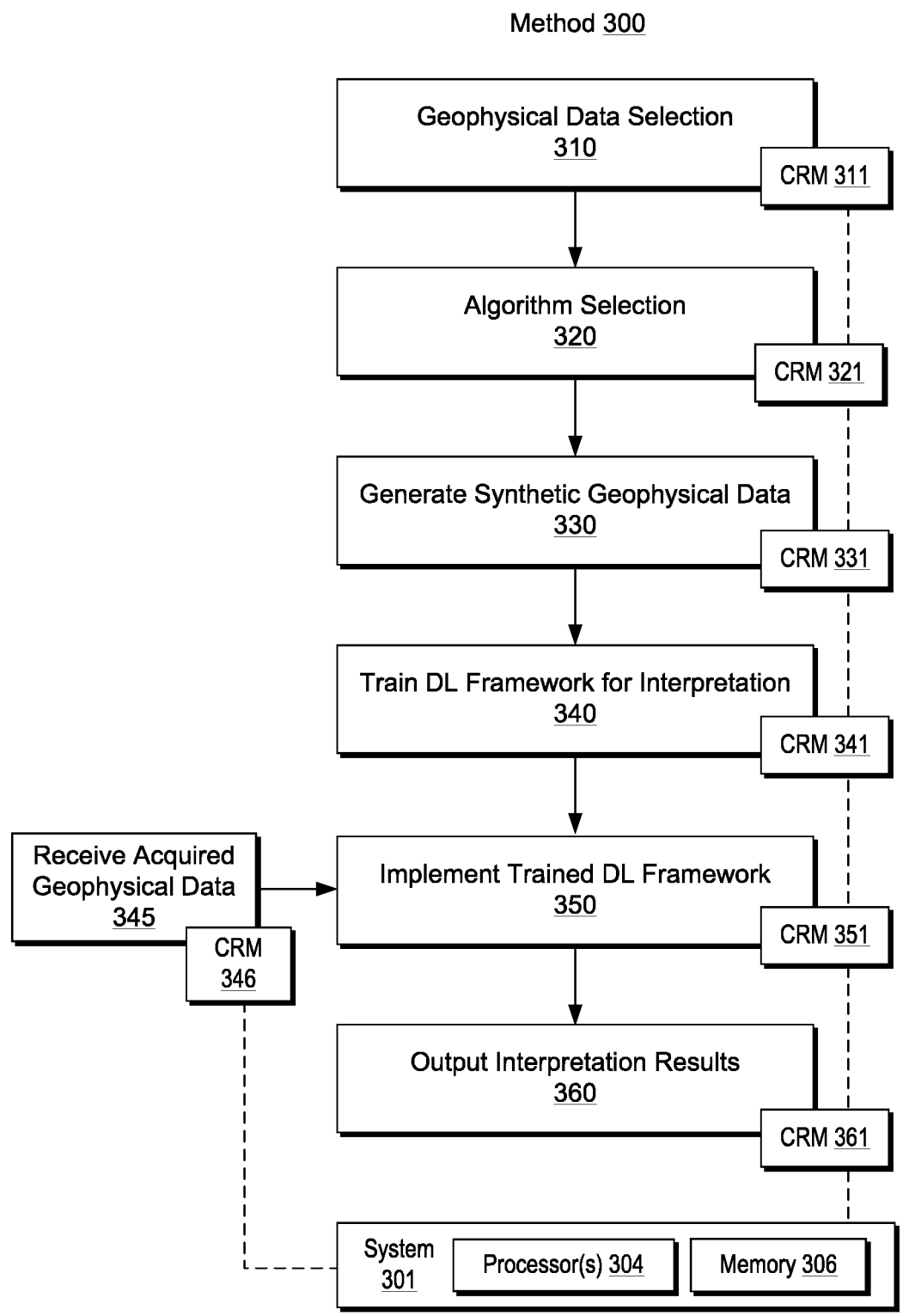
FIG. 3 illustrates an example of a method.

FIG. 3 shows an example of a method 300 and an example of a system 301. As shown, the method 300 includes a selection block 310 for selecting geophysical data (e.g., selecting a type or types of geophysical data), a selection block 320 for selecting one or more algorithms, a generation block 330 for generating synthetic geophysical data, a train block 340 for training a deep learning framework for interpretation, a reception block 345 for receiving acquired geophysical data, an implementation block 350 for implementing the trained deep learning framework for interpretation of at least a portion of the acquired geophysical data, and an output block 360 for outputting interpretation results. As mentioned, a method can include performing one or more actions based at least in part on interpretation results as may be output per the output block 360. For example, a signal may be issued that instructions one or more pieces of equipment to perform one or more actions, which may be one or more field actions (e.g., as to exploration, surveying, data acquisition, drilling, stimulation, production, etc.).

The method 300 is shown in FIG. 3 in association with various computer-readable media (CRM) blocks 311, 321, 331, 341, 346, 351 and 361. Such blocks generally include instructions suitable for execution by one or more processors (or cores) to instruct a computing device or system to perform one or more actions. While various blocks are shown, a single medium may be configured with instructions to allow for, at least in part, performance of various actions of the method 300. As an example, a CRM block can be a computer-readable storage medium that is non-transitory, not a carrier wave and not a signal. As an example, such blocks can include instructions that can be stored in memory and can be executable by one or more of processors.

The system 301 can include one or more processors 304 and memory 306, which can be one or more memory devices where at least one is accessible by at least one of the one or more processors 304. As an example, one or more features of the blocks 311, 321, 331, 341, 346, 351 and 361 may be provided in the form of executable instructions storable in the memory 306. For example, such instructions can include processor-executable instructions that can cause the system 301 to perform one or more actions of the method 300.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

Figure 4:
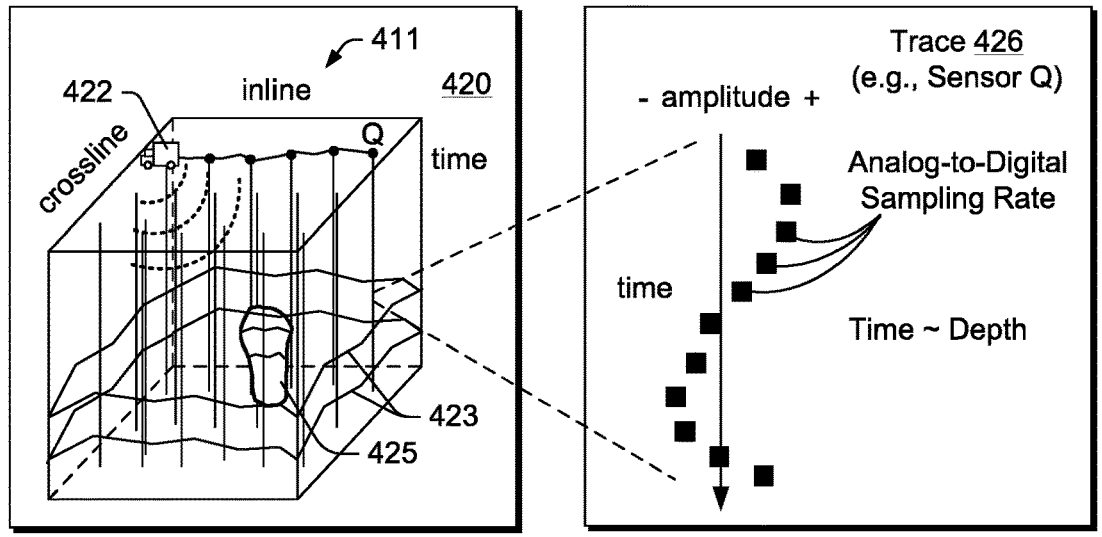
FIG. 4 illustrates examples of data acquisition techniques.
Figure 4:
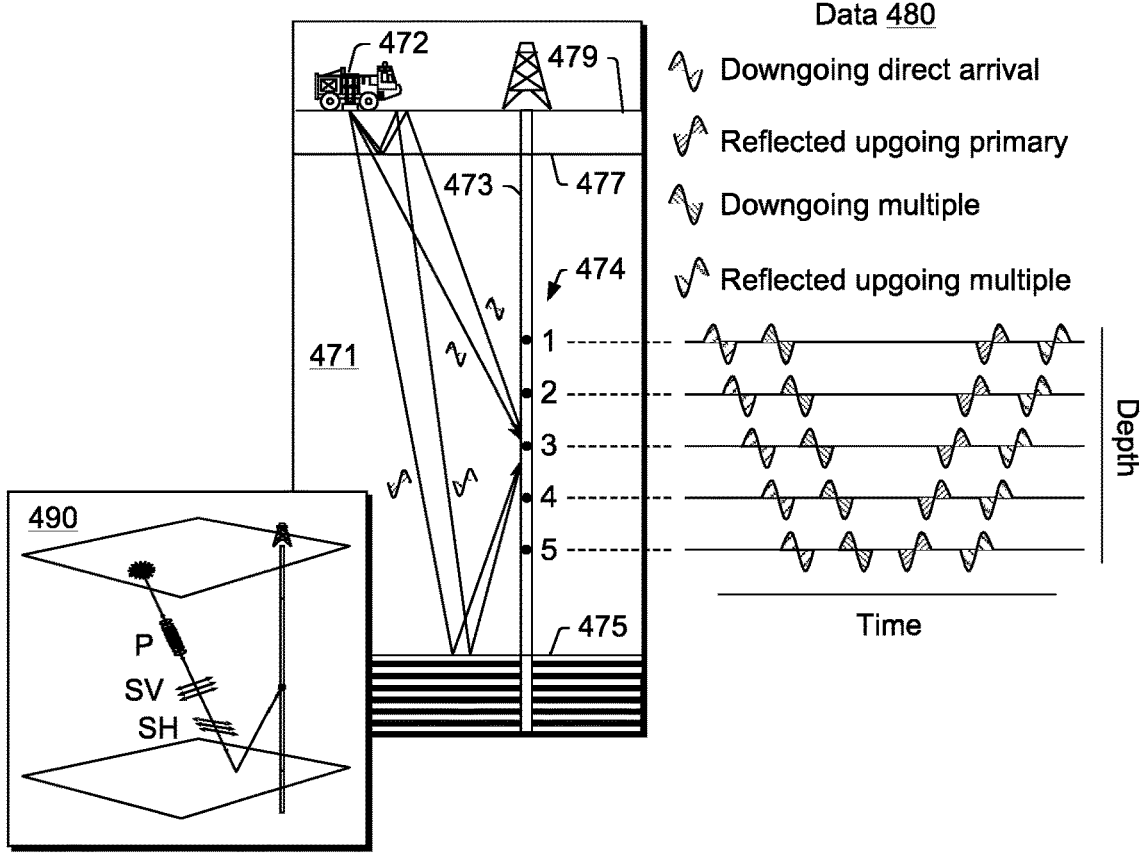

FIG. 4 shows an example of an acquisition technique 410 in a geologic environment 411 for acquisition of seismic data 420 and a portion of a trace 426 and an example of an acquisition technique 470 in a geologic environment 471 to acquire seismic data 480. In FIG. 4, the acquisition technique 410 may be a surface technique that utilizes surface equipment while the acquisition technique 470 is shown as utilizing surface equipment and one or more downhole pieces of equipment. Various features of the data 480 may be present in the data 420, for example, the trace 426 may include indicia of multiples, etc.

A computational framework, which may be a system, can process data acquired by the technique 410 and/or the technique 470, for example, to allow for direct or indirect management of sensing, drilling, injecting, extracting, etc., with respect to the geologic environment 150 of FIG. 1. In turn, further information about the geologic environment 150 may become available as feedback (e.g., optionally as input to the system).

As an example, a framework such as the PETREL® framework may be utilized to process data acquired by the technique 410 and/or the technique 470 where the framework may train and/or implement one or more deep learning networks. For example, an add-on and/or API may be utilized for such training and/or implementation for purposes of interpreting seismic data. In such an example, the add-on and/or API may provide access to one or more algorithms that generate training data (e.g., training datasets), which can include synthetic datasets and/or semi-synthetic datasets. The generation of one or more datasets may account for one or more aspects of a geologic environment, one or more aspects of an acquisition technique, etc. As an example, a generated dataset may be based at least in part on a model of a geologic environment. For example, a model of the geologic environment 411 and/or a model of the geologic environment 471 may be utilized to generate synthetic seismic data.

As an example, one or more algorithms may modify a model (e.g., randomly within a predefined set of parameters) to generate one or more datasets. As an example, a model can include labels where synthetic seismic data generated through use of the model can preserve such labels where the synthetic seismic data, with associated labels, may be utilized for training one or more deep learning networks. As an example, a portion of a geologic environment may be modeled and modified for purposes of synthetic seismic data generation. In such an example, the synthetic seismic data may be utilized to replace actual ("real") seismic data and/or to modify such actual seismic data. Such an approach may be utilized to generate one or more semi-synthetic datasets.

As an example, a model modification may pertain to one or more structural features such as an interface, a fault, a fracture, a geobody, etc. For example, where the shape of an interpreted geobody is to be enhanced, a model may be modified or a plurality of models generated with geobodies of different shapes where such different shapes can be labeled with one or more labels. In such an example, seismic data may be simulated for each of the different shapes where the seismic data include indicia thereof. Such seismic data may be utilized to train a deep learning network where the trained deep learning network may be utilized to interpret real seismic data (e.g., non-synthetic seismic data) of a geologic environment to output interpretation results that more accurately characterize the shape of a geobody in the geologic environment. Such an approach may further account for illumination effects associated with a geobody (e.g., geobody size, shape, etc.). In such an example, a smaller sized geobody of a given shape may effect illumination of a deeper structural feature less than a more accurately sized and shaped geobody. In a training dataset, the smaller sized geobody may provide seismic data that more clearly depicts the deeper structural feature, which may be a labeled feature. In such an example, a trained deep learning network may be able to identify the deeper structural feature based at least in part on training with respect to one or more geobodies. For example, training based on the smaller sized geobody may provide seismic data that helps to identify the deeper structural feature while training based on the more accurately sized geobody helps to identify the actual geobody. The foregoing example, which may be performed utilizing one or more of the blocks of the method 300 of FIG. 3, demonstrates how variations in training datasets can facilitate interpretation of multiple structural features in real seismic data, even where illuminate effects may be detrimental to identification of at least one of the multiple structural features.

As mentioned, synthetic and/or semi-synthetic seismic data may be generated based on one or more aspects of a geologic environment and/or one or more aspects of acquisition (e.g., acquisition geometry, technique, equipment, etc.). As an example, a training dataset can be generated for a given acquisition geometry with variations thereto. Such variations may account for position and/or orientation of one or more emitters and/or one or more sensors. As an example, a training dataset may be generated for a given acquisition equipment type with variations thereto. Such variations may account for type of ADC (e.g., bit depth, etc.), sampling rate, etc.

As to some particular aspects of data acquisition, as mentioned, seismic data may be acquired for a region in the form of traces. In FIG. 4, as to the technique 410, acquisition equipment 422 can emit energy from a source (e.g., a transmitter) where the energy can be received (e.g., after reflection, attenuation, etc.) via one or more sensors (e.g., receivers) strung along an inline direction, noting that the acquisition geometry also includes a crossline direction defined by a series of inline direction strings. As the region includes layers 423 and a geobody 425, energy emitted by the acquisition equipment 422 can reflect off the layers 423 and the geobody 425. Evidence of such reflections may be found in the acquired traces. As to the portion of a trace 426, energy received may be discretized by an analog-to-digital converter (ADC) that operates at a sampling rate. For example, the acquisition equipment 422 may convert energy signals sensed by sensor Q to digital samples. As mentioned, such data may be stored according to a format such as the SEGY format.

In FIG. 4, the technique 470 may be implemented with respect to a geologic environment 471. As shown, an energy source (e.g., a transmitter) 472 may emit energy where the energy travels as waves that interact with the geologic environment 471. As an example, the geologic environment 471 may include a bore 473 where one or more sensors (e.g., receivers) 474 may be positioned in the bore 473. As an example, energy emitted by the energy source 472 may interact with a layer (e.g., a structure, an interface, etc.) 475 in the geologic environment 471 such that a portion of the energy is reflected, which may then be sensed by one or more of the sensors 474. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 471 is shown as including a layer 477 that resides below a surface layer 479. Given such an environment and arrangement of the source 472 and the one or more sensors 474, energy may be sensed as being associated with particular types of waves.

As shown in FIG. 4, acquired data 480 can include data associated with downgoing direct arrival waves, reflected upgoing primary waves, downgoing multiple reflected waves and reflected upgoing multiple reflected waves. The acquired data 480 is also shown along a time axis and a depth axis. As indicated, in a manner dependent at least in part on characteristics of media in the geologic environment 471, waves travel at velocities over distances such that relationships may exist between time and space. Thus, time information, as associated with sensed energy, may allow for understanding spatial relations of layers, interfaces, structures, etc. in a geologic environment.

FIG. 4 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy) in a geologic environment, consider the Thomsen parameters $\epsilon$, $\delta$ and $\gamma$. The Thomsen parameter $\delta$ can describe offset effects (e.g., short offset). As to the Thomsen parameter $\epsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, synthetic and/or semi-synthetic seismic data may be generated based at least in part on isotropy and/or anisotropy. For example, a method can include generating seismic data for a plurality of different Thomsen parameter values for one or more of the Thomsen parameters. In such an example, the data, as training datasets, may be labeled and utilized to train one or more deep learning networks where one or more such trained deep learning networks may be utilized to interpret actual seismic data of a geologic environment, for example, with respect to isotropy and/or anisotropy of one or more materials in the geologic environment.

Figure 5:
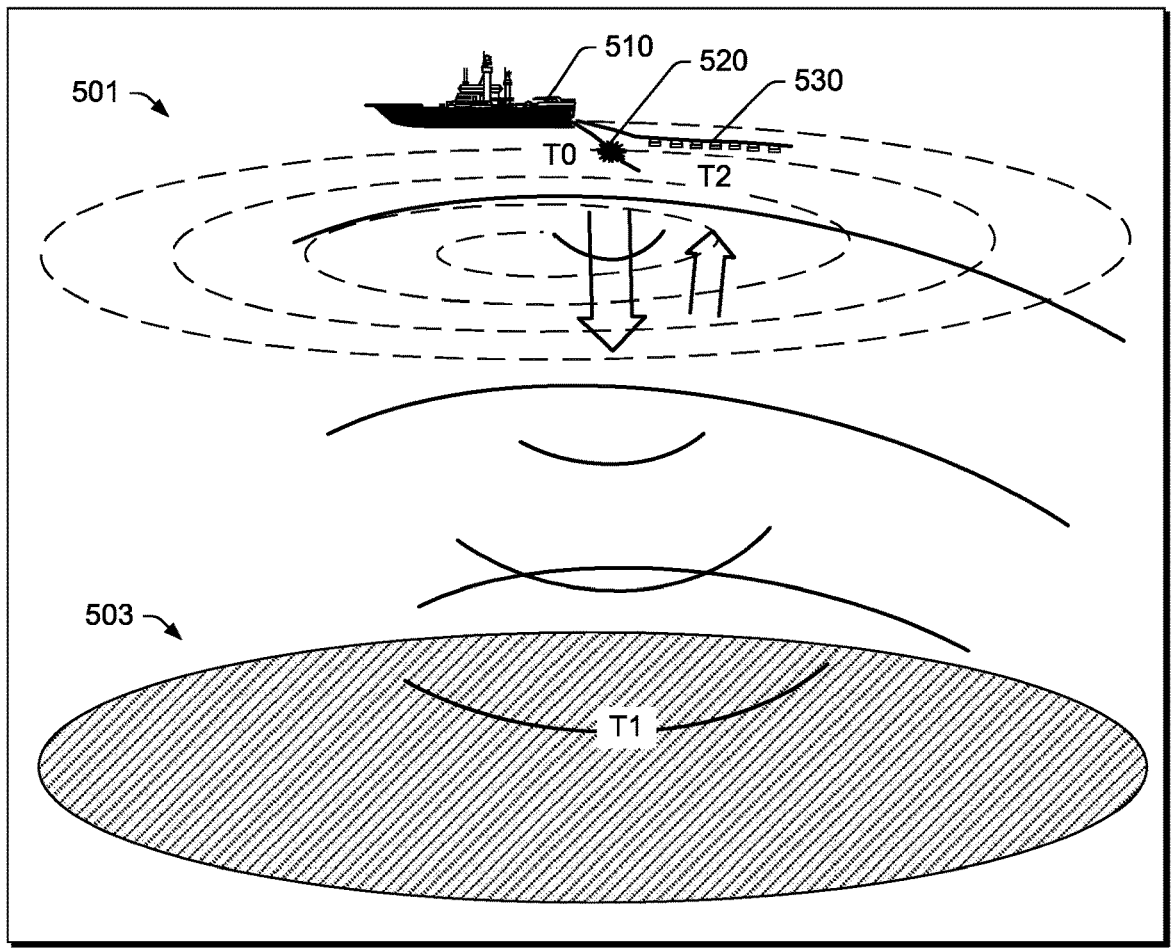
FIG. 5 illustrates an example of a data acquisition technique, examples of equipment and an example of a system.
Figure 5:
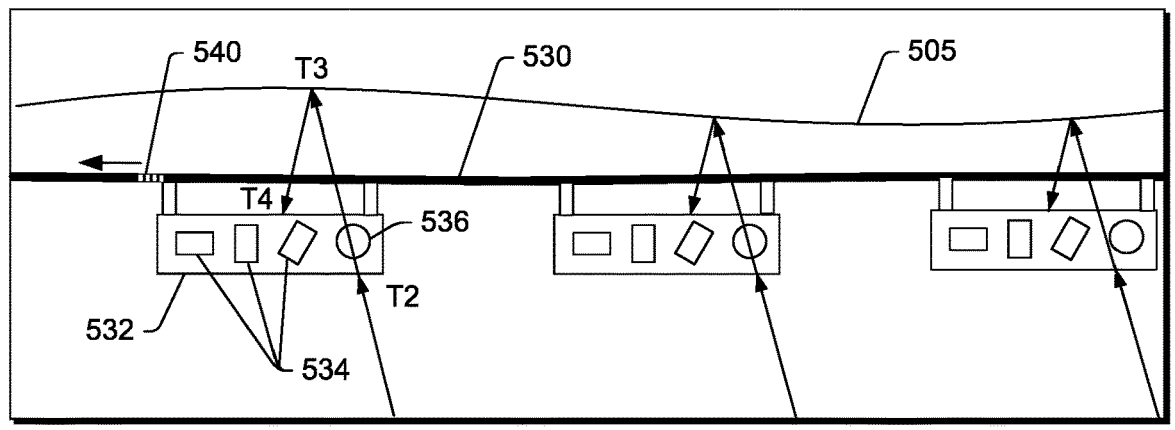
Figure 5:
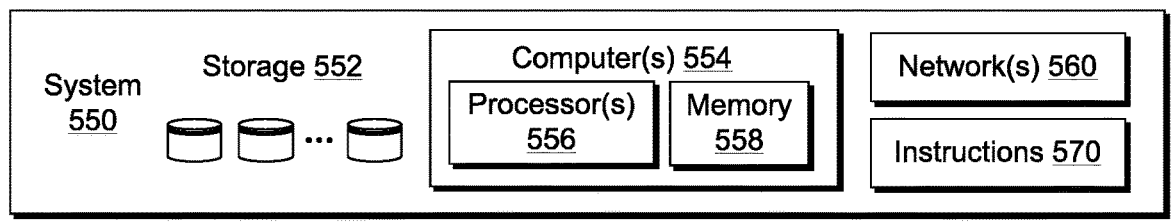

FIG. 5 shows an example of a geologic environment 501 that includes a seabed 503 and a sea surface 505. As shown, equipment 510 such as a ship may tow an energy source 520 and a string of sensors 530 at a depth below the sea surface 505. In such an example, the energy source 520 may emit energy at a time T0, a portion of that energy may be reflected from the seabed 503 at a time T1 and a portion of that reflected energy may be received at the string of sensors 530 at a time T2.

As mentioned with respect to the technique 470 of FIG. 4, a wave may be a primary or a multiple. As shown in an enlarged view of the geologic environment 501, the sea surface 505 may act to reflect waves such that sensors 532 of the string of sensors 530 may sense multiples as well as primaries. In particular, the sensors 532 may sense so-called sea surface multiples, which may be multiples from primaries or multiples of multiples (e.g., due to sub-seabed reflections, etc.).

As an example, each of the sensors 532 may sense energy of an upgoing wave at a time T2 where the upgoing wave reflects off the sea surface 505 at a time T3 and where the sensors may sense energy of a downgoing multiple reflected wave at a time T4 (see also the data 480 of FIG. 4 and data 540 of FIG. 5).

In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 505 (e.g., arrival times T2 and T4 may be relatively close). As an example, the sea surface 505 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 532 may include at least one geophone 534 and a hydrophone 536. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 5, the at least one geophone 534 can provide for motion detection and the hydrophone 536 can provide for pressure detection. As an example, the data 540 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 5, the equipment 510 may include a system such as the system 550. As shown in FIG. 5, the system 550 includes one or more information storage devices 552, one or more computers 554, one or more network interfaces 560 and one or more sets of instructions 570. As to the one or more computers 554, each computer may include one or more processors (e.g., or processing cores) 556 and memory 558 for storing instructions (e.g., consider one or more of the one or more sets of instructions 570), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 550 may receive P and Z data via one or more of the one or more network interfaces 560 and process such data, for example, via execution of instructions stored in the memory 558 by the processor 556. As an example, the system 550 may store raw and/or processed data in one or more of the one or more information storage devices 552.

As an example, a method can include generating one or more training datasets for training one or more deep learning networks for interpretation of seismic data from a marine-based seismic survey. For example, such training datasets may be generated with respect to weather, wave motion of water waves, ghosts, seabed features, etc. Such training dataset may be appropriately labeled as to aspects that may help to identify and/or reduce the impact of noise (e.g., wave motion, ghosts, etc.) in actual seismic data.

Figure 6:
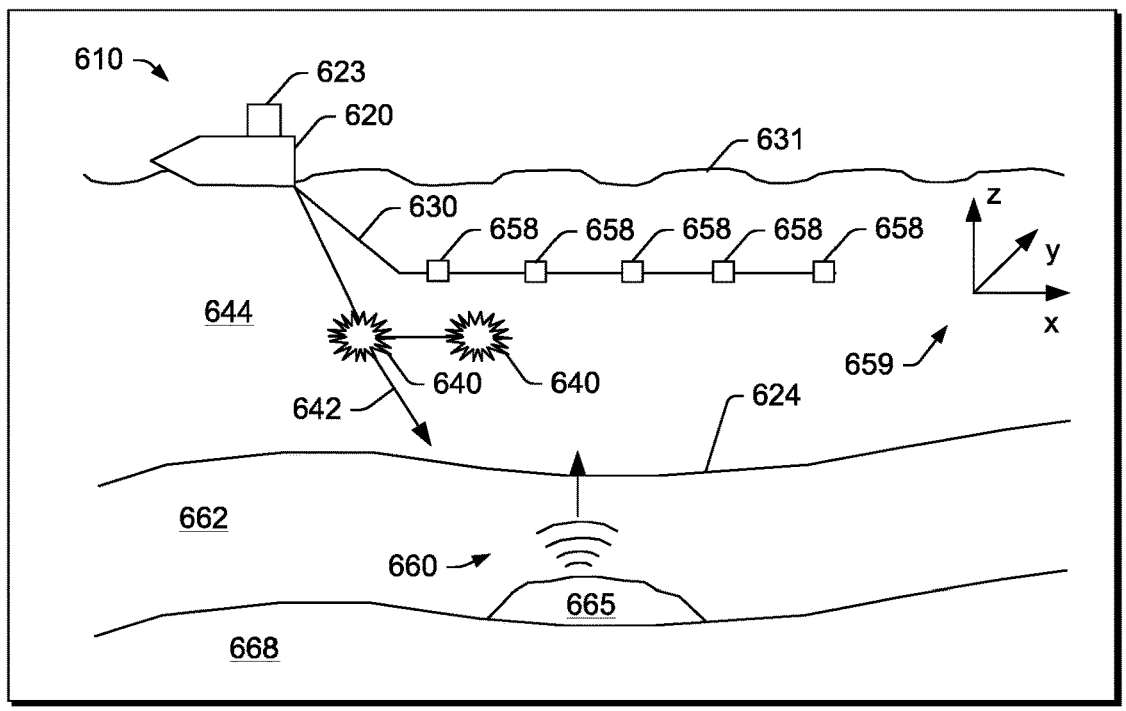
FIG. 6 illustrates an example of a survey and sources and an example of timing sequences.
Figure 6:
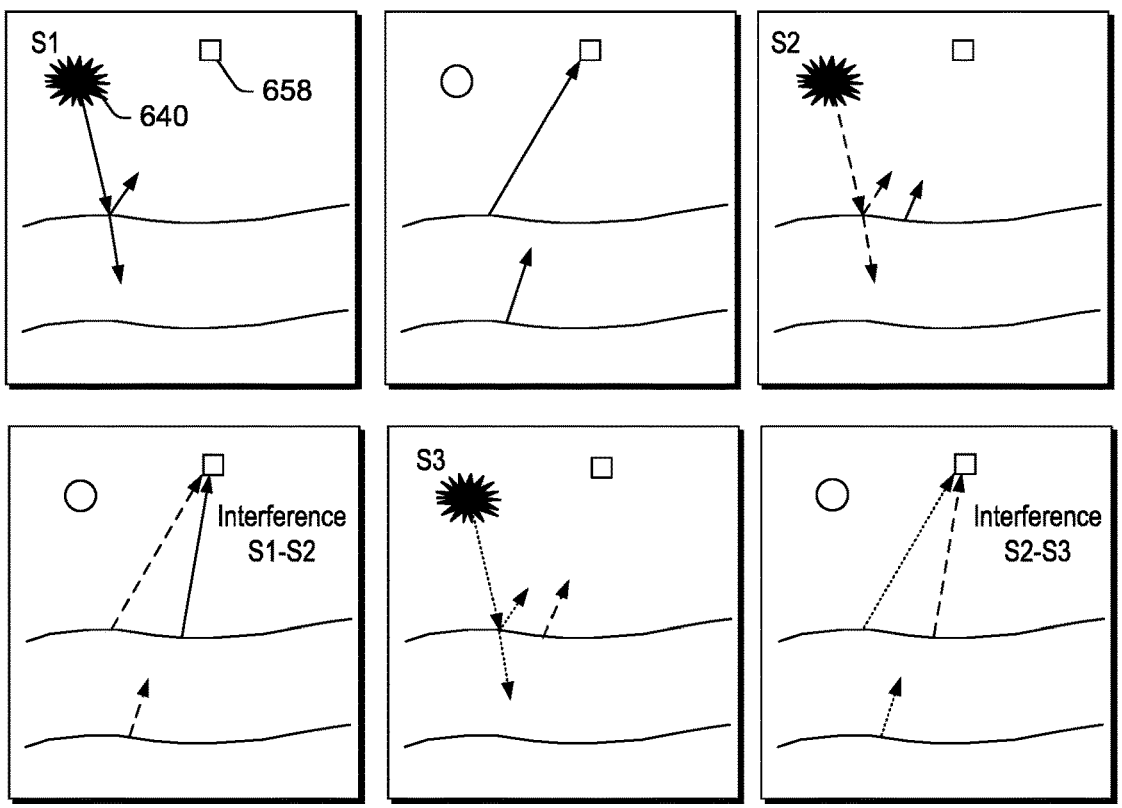

FIG. 6 illustrates a schematic diagram of an example of a marine-based seismic acquisition system 610 and an example of a method 690. In the system 610, a survey vessel 620 may tow one or more seismic streamers 630 behind the vessel 620. As an example, streamers 630 may be arranged in a spread in which multiple streamers 330 are towed in approximately a plane at a depth. As an example, streamers may be towed at multiple depths (e.g., consider an over/under configuration).

As an example, the seismic streamers 630 may be several thousand meters long and may include various support cables, as well as wiring and/or circuitry that may be used to facilitate communication along the streamers 630. As an example, an individual streamer 630 may include a primary cable where the seismic sensors 658 that can record seismic signals may be mounted. As an example, the seismic sensors 658 may include hydrophones that acquire pressure data. As another example, the seismic sensors 658 may include one or more multi-component sensors, for example, consider a sensor capable of detecting a pressure wavefield and at least one component of a particle motion that is associated with acoustic signals that are proximate to the sensor. Examples of particle motions include one or more components of a particle displacement, one or more components (e.g., inline (x), crossline (y) and vertical (z) components (see, e.g., coordinate axes 659) of a particle velocity and one or more components of a particle acceleration.

As an example, the marine-based seismic data acquisition system 310 may include one or more seismic sources 640 (e.g., air guns, etc.). As shown in the example of FIG. 6, the seismic sources 640 may be coupled to, or towed by, the survey vessel 620. As another example, the seismic sources 640 may operate independently of the survey vessel 620 in that the sources 640 may be coupled to another vessel or vessels, to a buoy or buoys, etc.

As an example, the seismic streamers 630 can be towed behind the survey vessel 620 where acoustic signals 642 (e.g., "shots") may be produced by the seismic sources 640. The acoustic signals 642 may be directed down through a water column 644 into strata 662 and 668 beneath a water bottom surface 624. As an example, at least a portion of the acoustic signals 642 may be reflected from subterranean geological formation(s), for example, consider a formation 665 as depicted in FIG. 6.

As an example, incident acoustic signals 642 generated by the sources 640 can produce corresponding reflected acoustic signals, or pressure waves 660, which may be sensed by one or more of the seismic sensors 658. As an example, pressure waves received and sensed by one or more of the seismic sensors 658 may include "up going" pressure waves that propagate to the one or more sensors 658 without reflection and, for example, "down going" pressure waves that are produced in part by reflections of the pressure waves 660 from an air-water boundary 631.

As an example, the seismic sensors 658 may generate signals, which may be traces or structured as traces (e.g., amplitude with respect to time, etc.). For example, consider traces that include information as to measurements of pressure wavefield and particle motion. As an example, signals may be recorded and may be processed by a signal processing unit 623, which may optionally be deployed on the survey vessel 620.

As an example, a method can include performing a seismic survey that acquires seismic data (e.g., traces, etc.) where such data can build an "image" of a survey area, for example, for purposes of identifying one or more subterranean geological formations (see, e.g., the formation 665). As an example, subsequent analysis of seismic data (e.g., interpretation, etc.) may reveal one or more possible locations of hydrocarbon deposits in one or more subterranean geological formations. As an example, an analysis can include determining one or more characteristics of one or more types of hydrocarbons. As an example, an analysis can include one or more of image generation and attribute generation (e.g., seismic attribute generation, etc.).

As an example, a particular one of the one or more seismic sources 340 may be part of an array of seismic source elements (e.g., air guns, etc.) that may be arranged in strings (e.g., gun strings, etc.) of the array. As an example, one or more sources may be fired (e.g., actuated to emit energy) according to a time schedule (e.g., a timing sequence) during a survey. As an example, a land-based seismic acquisition system may acquire data that may be processed, for example, via one or more of the methods described herein.

As mentioned, sources may be fired (e.g., actuated) according to a time schedule, a timing sequence, etc. As an example, consider a sequential source firing method that includes firing sources at intervals combined with continuous vessel travel. As another example, consider a simultaneous source firing method that include firing more than one shot at a given point in time (e.g., within a small duration of time such that analysis may consider the shots to be simultaneous). In such an example, sensors may sense information from multiple simultaneous shots and, for example, processing of the sensed information may separate the sensed information into individual source components. As an example, where simultaneous source firing is implemented, "boat time" (e.g., turnaround time, etc.) may be approximately the same or less than a sequential technique (e.g., depending on survey parameters, goals, etc.).

In FIG. 6, the method 690 includes firing a source 640 at a source firing time S1, firing the source 640 at a source firing time S2 and firing the source 640 at a source firing time S3. The method 690 also includes receiving signals at the seismic sensor 658. Such a method may result in strong deep interference. For example, where after one shot is fired from a source, a subsequent shot is fired from the source and energy associated with the subsequent shot is received at a seismic sensor over a period of time during which energy from the prior shot is also received. In such an example, a portion of energy of the prior shot interferes with acquisition of energy from the latter shot. The portion of energy from the prior shot may be referred to as late arriving energy (e.g., late data). As an example, interference may also occur in a survey where sources are fired in a relatively simultaneous manner. In such an example, some amount of interference may be expected and, for example, a purposeful part of a survey.

As to the energy associated with the source 640 at the source firing time S1, it can be partially reflected at an interface to generate a reflected upgoing portion while another portion penetrate deeper toward another interface. Thus, in the simplified illustration, two portions exist, an upgoing portion and a downgoing portion. As illustrated, at approximately a source firing time S2, an upgoing portion from the source firing time S1 and an upgoing portion from the source firing time S2 can exist. As these portions travel upwards, they can arrive at the seismic sensor 658 over a common span of time to result in S1-S2 interference. As illustrated, for the source firing time S3, there may be S2-S3 interference. Accordingly, interference can exist in data for a plurality of shots of a survey.

As an example, a method can include generating one or more training datasets for training one or more deep learning networks for interpretation of seismic data from a marine-based seismic survey. For example, such training datasets may be generated with respect to number of sources, number of sensors, types of sensors, weather, wave motion of water waves, ghosts, seabed features, etc. Such training dataset may be appropriately labeled as to aspects that may help to identify and/or reduce the impact of noise (e.g., interference, wave motion, ghosts, etc.) in actual seismic data.

As an example, interference can exist in one or more types of surveys such as, for example, a land-based survey or a sea-based survey. As mentioned, interference can be more pronounced where a survey aims to acquire data for deep structures in a geologic environment.

Figure 7:
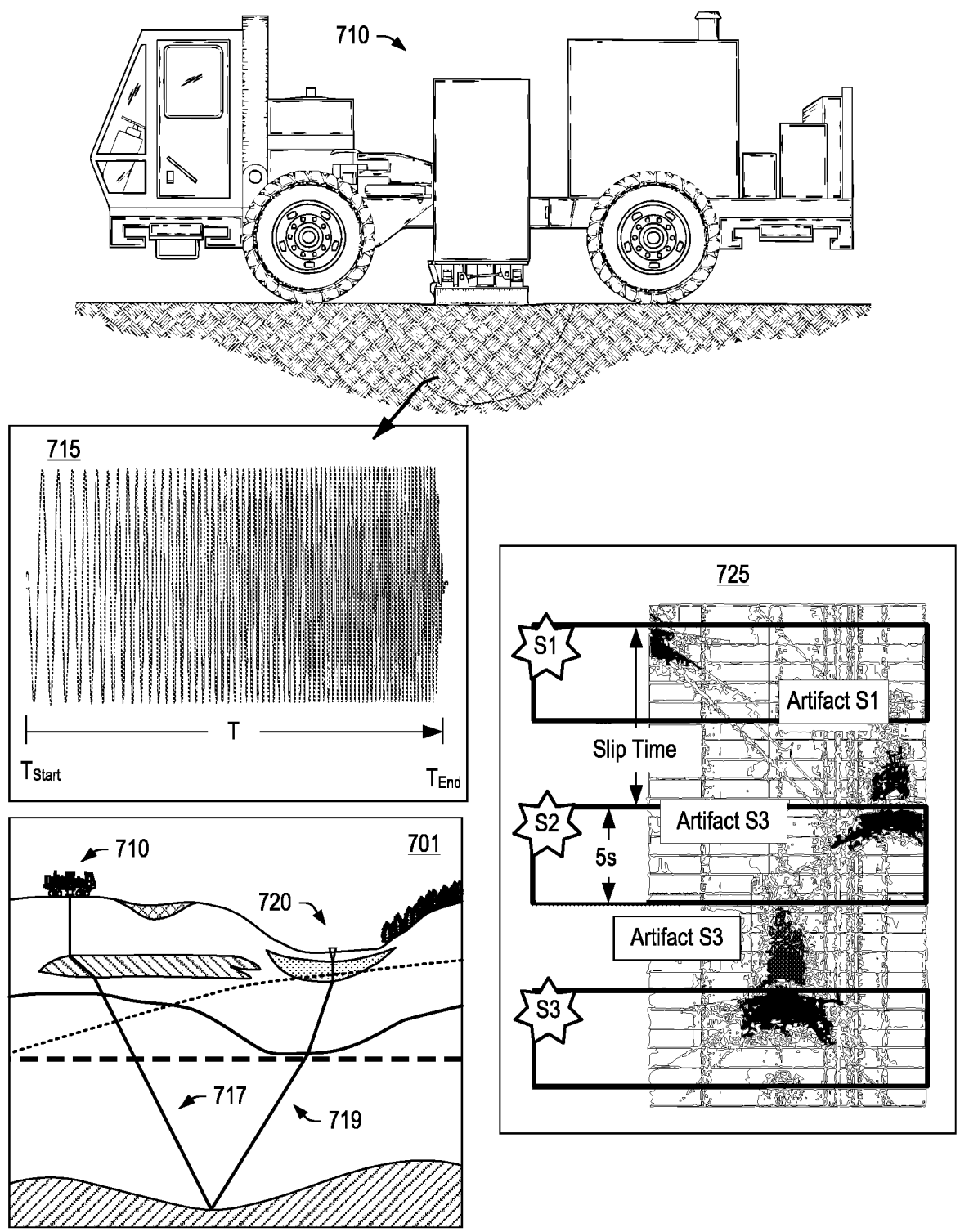
FIG. 7 illustrates an example of a survey and sources and an example of timing sequences.

FIG. 7 shows a geologic environment 701 (lower left), equipment 710, a plot 715 of a frequency sweep as generated by the equipment 710 (e.g., with start and end times), downgoing energy 717 of the frequency sweep, upgoing energy 719 of the frequency sweep, and a sensor 720 (a node as in an array or grid). While FIG. 7 is shown as a land-based survey, various features, actions, etc., may be applied in a marine survey where seabed sensors are employed.

FIG. 7 also shows a plot of data 725, as may be acquired using various field equipment. In FIG. 7, the data 725 are a simultaneous vibroseis survey that included seismic energy emissions S1, S2 and S3. Specifically, the data are plotted as a correlated record from a simultaneous vibroseis acquisition where artifacts of an air blast from S1 (cross airwave), chimney noise from S3 and harmonic from S3 (cross harmonic) are labeled along with a slip time and a record length for S2 (about 5 seconds). In a vibroseis survey, various types of noise may be present such as chimney noise, which may be seen when data are correlated with a survey sweep and visualized (as a column). As to other types of noise, these may include ground-roll and/or air-blast types of noise. In a slip-sweep operations data can be recorded as a mother record where the interval between two consecutive sweeps is referred to as the slip time (see S1 and S2 and slip time).

A frequency sweep of seismic energy as emitted by a seismic energy source (vibrator, etc.) can travel into a geologic environment and can be reflected at least in part by material in the geologic environment (consider a reflector as an interface between layers of contrasting acoustic properties). In a record of sensed seismic energy, as acquired by one or more sensor units, the reflector can be an event that exists as a feature in the record (traces, etc.) as associated with various frequencies of the frequency sweep, which is spread across a duration in time. In such an approach, the record can include information associated with the reflector as "imaged" by a plurality of frequencies of the frequency sweep. As the frequency sweep occurs over a duration in time, the event can appear in the record at a plurality of times.

As shown in the plot 715 of FIG. 7, the frequency sweep includes a start time ($T_{Start}$) and an end time ($T_{End}$) where a duration between these two times is labeled T ($T=T_{End}-T_{Start}$). A record length associated with emitted energy and seismic data is shown in the plot 725 of FIG. 7 (see S2 and the record length of about 5 seconds).

As to noise, ground roll is a type of coherent noise generated by a surface wave such as, for example, a low-velocity, low-frequency, high-amplitude Rayleigh wave. Ground roll can obscure signal and degrade overall data quality.

Figure 8:
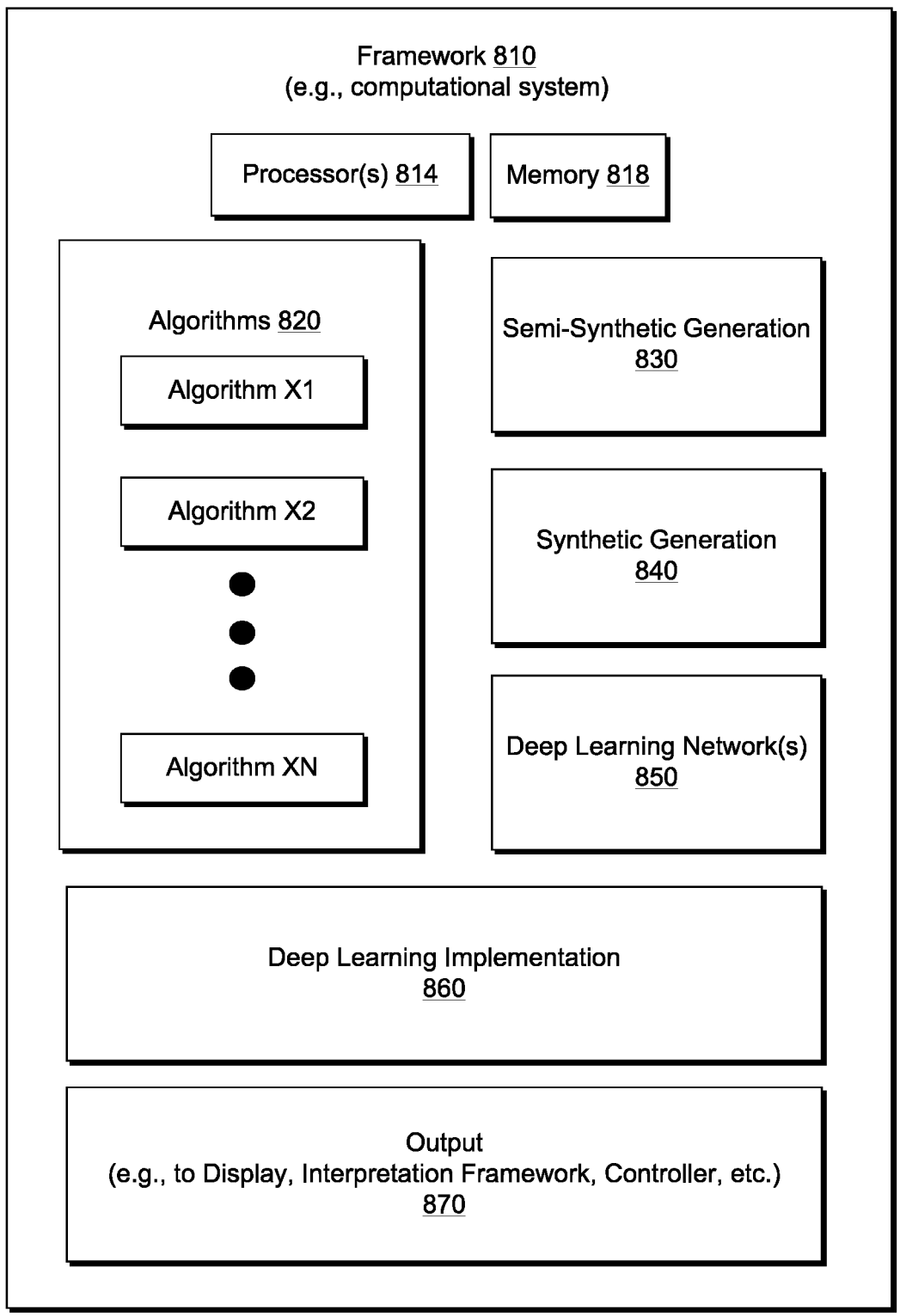
FIG. 8 illustrates an example of a framework.

FIG. 8 shows an example of a framework 810, which can be a computational framework or a system such as a computational system. As shown, the framework 810 can include one or more processors 814 and memory 818, which can be one or more memory devices where at least one is accessible by at least one of the one or more processors 814. As an example, one or more features of the framework 810 may be provided in the form of executable instructions storable in the memory 818. For example, such instructions can include processor-executable instructions that can cause the framework 810 to perform one or more actions (e.g., one or more actions of one or more of methods, etc.).

As shown in FIG. 8, the framework 810 includes a plurality of selectable algorithms 820 (e.g., X1, X2, to XN), a semi-synthetic generation block 830, a synthetic generation block 840, a deep learning network(s) block 850, a deep learning implementation block 860 (e.g., for training and/or implementing a trained deep learning network(s)), and an output block 870 to output information to a display, an interpretation framework, a controller, etc.

As to the semi-synthetic generation block 830, it may operate as to augmentation of real data set (seismic, microseismic, log, etc.); generation and/or augmentation of synthetic data with real data; generation and/or augment synthetic of data with modified real data; and generation and/or augmentation of data in real-time during acquisition and/or processing (e.g., via velocity model perturbation, etc.) to output one or more training datasets.

As to the synthetic generation block 840, it may operate as to generation and/or augmentation of synthetic data (seismic, microseismic, log, etc.); generation and/or augmentation of synthetic data based on survey parameters, equipment, etc.; and augmentation of synthetic based on production data, stimulation treatment, etc.

As an example, the framework 810 may operate to train one or more deep learning algorithms and, for example, optionally link to an interpretation framework (e.g., PETREL® framework, etc.), optionally operate according to one or more application programming interfaces (APIs) (e.g., APIs to call routines to generate training sets), and operate to output one or more trained models (e.g., deep learning networks, etc.).

Figure 9:
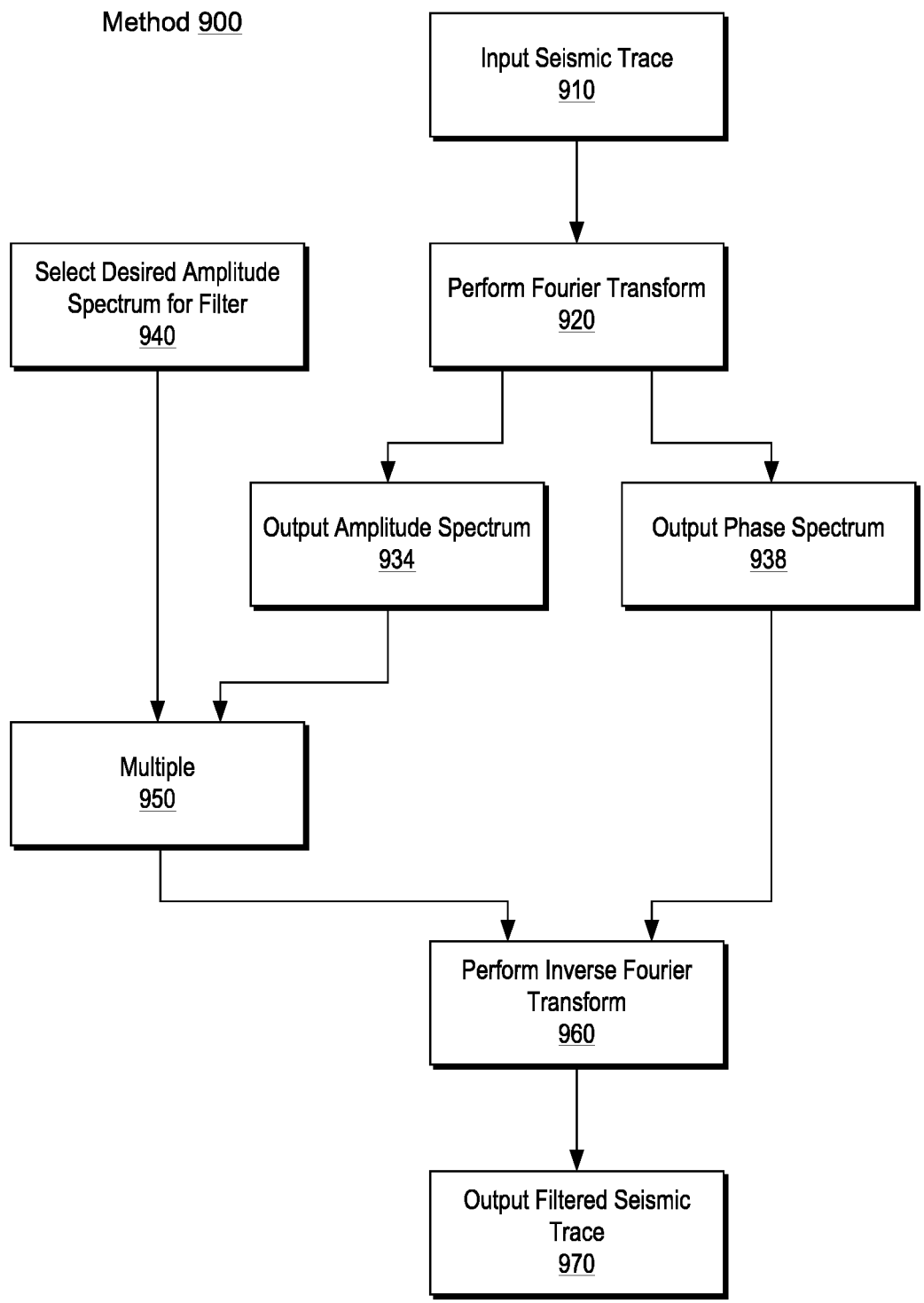
FIG. 9 illustrates an example of a method.

FIG. 9 shows an example of an algorithmic method 900 as may be performed, for example, via the framework 800 of FIG. 8 (e.g., as one or more of the algorithms 820). In the example of FIG. 9, the method 900 includes an input block 910 for inputting a seismic trace; a performance block 920 for performing a Fourier transform (FT); output blocks 934 and 938 for outputting an amplitude spectrum and for outputting a phase spectrum; a selection block 940 for selecting a desired amplitude spectrum as a filter; a multiple block 950; a performance block 960 for performing an inverse Fourier transform (IFT); and an output block 970 for outputting a filtered seismic trace.

The method 900 can perform frequency filtering and, for example, optionally provide for perturbation of one or more bandwidths spatially (e.g., in one or more locales of a space).

Figure 10:
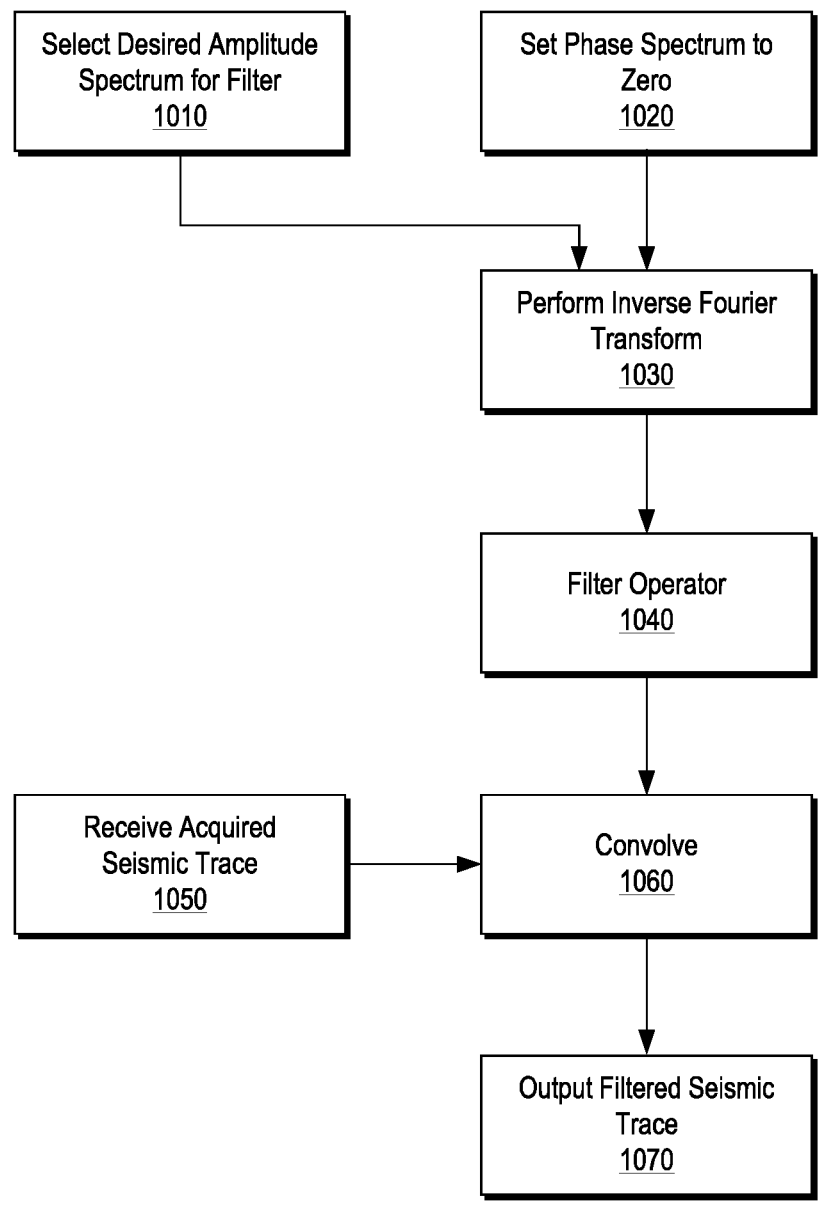
FIG. 10 illustrates an example of a method.

FIG. 10 shows an example of an algorithmic method 1000 as may be performed, for example, via the framework 800 of FIG. 8 (e.g., as one or more of the algorithms 820). In the example of FIG. 10, the method 1000 includes a selection block 1010 for selecting a desire amplitude spectrum as a filter; a set block 1020 for setting a phase spectrum to zero; a performance block 1030 for performing an inverse Fourier transform (IFT), a filter operation block 1040 for generation of a filter operator; a reception block 1050 for receiving an acquired seismic trace; a convolve block 1060 for convolving the acquired seismic trace based at least in part on the filter operator; and an output block 1070 for outputting a filtered seismic trace.

As to seismic data frequency filtering, frequency-domain filtering involves multiplying an amplitude spectrum of an input seismic trace by that of a filter operator; whereas, a filtering process in a time domain can involve convolving a filter operator with an input time series. Frequency- and time-domain formulations of a filtering process (see, e.g., FIG. 9 and FIG. 10) can be based on a concept in time series analysis in that convolution in the time domain can be equivalent to multiplication in the frequency domain and, convolution in the frequency domain can be equivalent to multiplication in the time domain.

As an example, frequency filtering can be in the form of band-pass, band-reject, high-pass (low-cut), or low-pass (high-cut) filters. Such filters can be based on construction of a zero-phase wavelet with an amplitude spectrum that meets one of a plurality of pre-determined specifications.

Figure 11:
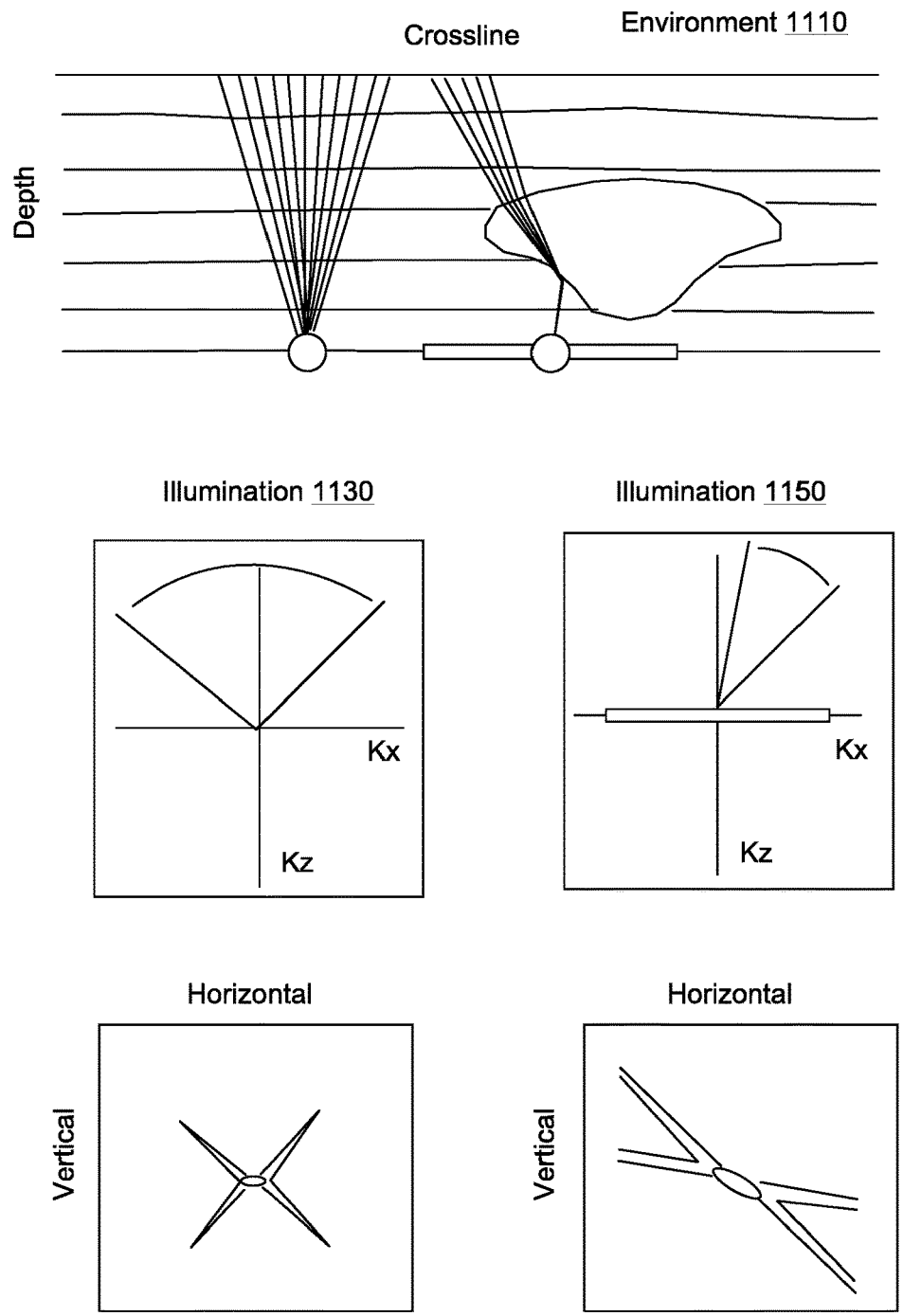
FIG. 11 illustrates an example of a method.

FIG. 11 shows an example of a survey in an environment 1110 with respect to two regions where one region (left)

experiences better illumination than another region (right), as illustrated with respect to a crossline dimension and a depth dimension.

FIG. 11 shows examples of plots for illumination 1130 (left) and illumination 1150 (right) to demonstrate how illumination can impact interpretation. In particular, illumination can impact resolution for interpretation where poorer resolution can confound interpretation.

As an example, one or more of the algorithms 820 of the framework 810 of FIG. 8 can include an algorithm that generates seismic data with particular illumination with respect to one or more objects. Such data may be utilized for purposes of training one or more deep learning networks. For example, the data illustrated in FIG. 11 may be included in one or more datasets where labels may be included as to information known a priori for purposes of training. As shown, an object such as a geobody can affect illumination. Such an object may be included and positioned in one or more manners in a model of an environment (e.g., an actual environment) to generate a training dataset of seismic data (e.g., synthetic seismic traces, etc.) as to location of an object and its effect on traces with respect to one or more features that are to be illuminated during a seismic survey. Such a dataset may be utilized to train a deep learning network that can more accurate locate one or more of an object and/or a structural feature that may be poorly illuminated due to the presence of the object (e.g., and location thereof with respect to a survey).

Figure 12:
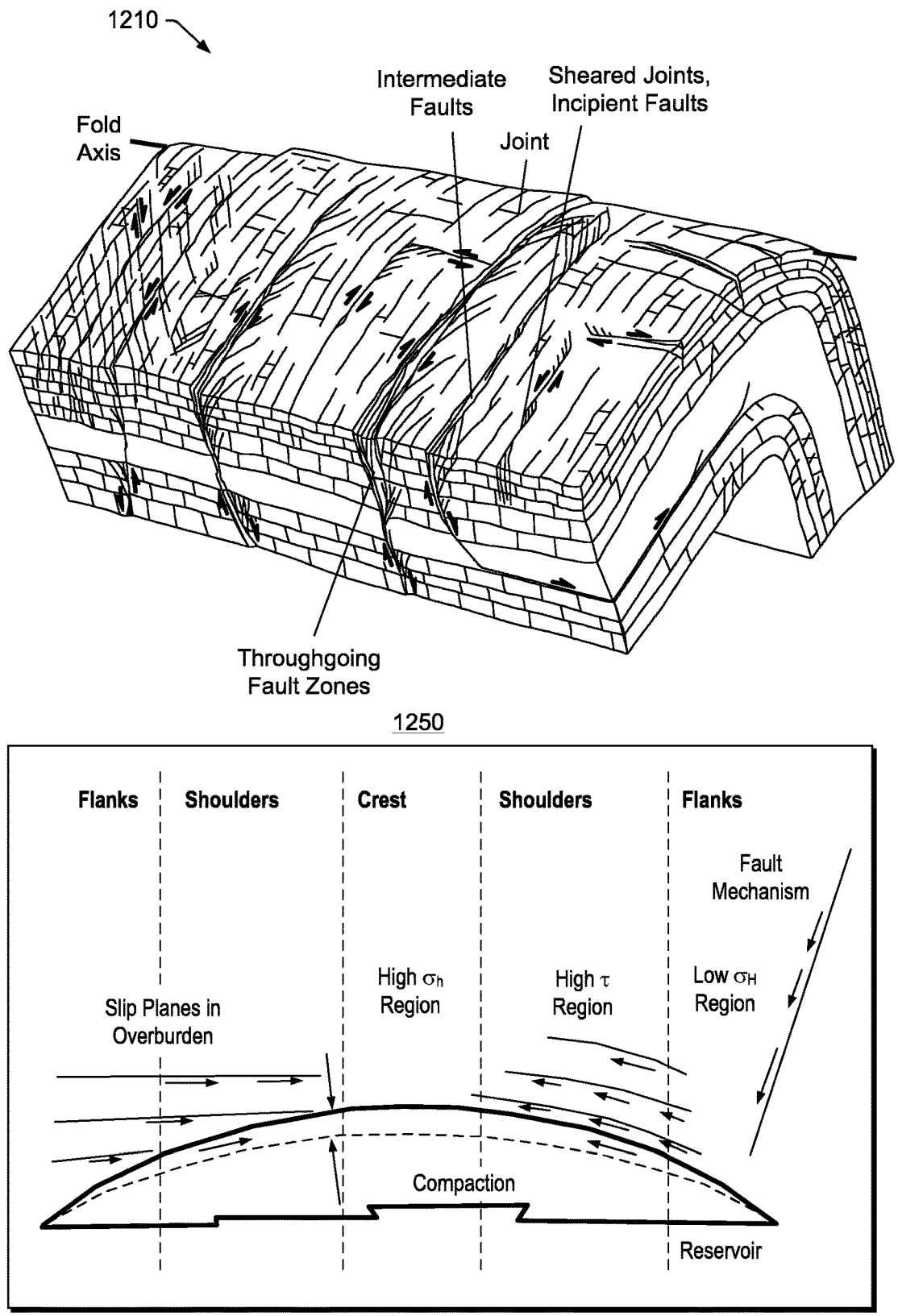
FIG. 12 illustrates an example of a geologic environment and various physical processes.

FIG. 12 shows an example of a geologic environment 1210 that includes various structural features such as faults, joints, folds. The presence of such features can affect seismic energy as emitted and acquired during a seismic survey.

As an example, the framework 810 of FIG. 8 can include one or more algorithms that can introduce one or more structural features to a model that is utilized to generate synthetic and/or augmented seismic data. For example, a model may be rendered to a display as part of a graphical user interface where a computer system can receive input that modifies the model to introduce, edit, delete, etc., one or more structural features. In response, seismic data can be generated and/or augmented where the seismic data includes information corresponding to the one or more structural features. In such an example, the structural features may be labeled where they are known a priori for purposes of training a deep learning network using seismic data.

FIG. 12 illustrates various examples of forces (see, e.g., arrows) that may be present in a geologic environment. As an example, production and/or injection of a reservoir or reservoirs in such an environment may alter forces, particularly over time as production and/or injection may occur and/or after production and/or injection may have occurred.

In FIG. 12, an environment 1250 illustrates how a portion of a field may compact. For example, flexure of a compacting field can cause slippage between weak lithologies or discontinuities. In such an example, on a field scale, total compaction and subsidence may be determined (e.g., analytically and/or numerically).

In a geologic environment, pore pressure may change over time as well as porosity. As an example, a model may include a dual approach to porosity where a matrix value (e.g., a rock matrix) is assigned to a region or regions and where fractures, faults, etc. may be assigned more specific values (e.g., as discontinuities in a matrix, etc.). For example, a model may include one or more matrix regions and one or more discrete fracture networks. Deformation may affect porosity values, pore pressures, etc. As an example, factors such as temperature and circulation may also affect material characteristics and be intertwined with deformation. Permeability in a region may depend on one or more factors, for example, relationships may exist between porosity and permeability. As a field compacts, flexure of the compacting field can cause slippage along weak lithologies or discontinuities (e.g., unconformities, interfaces between formations, interfaces of faults, fractures, etc.).

As an example, a model may be generated that accounts for changes in an environment where such changes may be based at least in part on one or more physical phenomena that occur over time. Where a temporal series of seismic data is acquired and to be analyzed by a deep learning framework, the deep learning framework may be trained based at least in part on synthetic seismic data that are generated using a model that is subjected to forces that cause the model to change with respect to time. In such an example, one or more aspects of the synthetic seismic data can be labeled for purposes of training. In such an example, a trained deep learning network may be utilized to interpret one or more processes that cause an environment to change with respect to time.

As an example, an algorithm of the one or more algorithms 820 of the framework 810 of FIG. 8 can include one or more structural feature related algorithms, which may be static and/or temporal.

As an example, an algorithm may provide for generating training data representing one or more types of fluid-flow deformations. For example, consider vertical morphing, to emulate perturbations in the underlying velocity model.

As mentioned, a geologic formation can deform over time. Deformation may effect one or more field operations (e.g., drilling, casing, cementing, measuring, production, injection, etc.) and may effect equipment deployed in a borehole or to be deployed in a borehole (e.g., whether cased, uncased, etc.).

As an example, a geomechanical simulation of a modeled geologic environment can provide information germane to how material in the geologic environment deforms. Further, where a geologic environment includes a reservoir, a reservoir simulation can provide information germane to material deformation. For example, consider simulating a reservoir where one or more wells inject fluid into and/or produce fluid from the reservoir over some period of time.

As an example, a geologic environment may include a plurality of reservoirs. In such an example, one or more of the reservoirs may be modeled. As an example, a geomechanical model may span at least a portion of a first reservoir and at least a portion of a second reservoir. In such an example, movement of fluid of the first reservoir and/or movement of fluid of the second reservoir may be analyzed with respect to geomechanics. For example, production of fluid of the first reservoir may result in compaction of reservoir rock of the first reservoir that may affect rock associated with the second reservoir. For example, the overburden of the first reservoir may be affected in a manner that also has an effect on the second reservoir. As an example, a geomechanical model may be coupled to a plurality of reservoir models. In such an example, a geomechanics modeling framework that models a geologic environment may be operatively coupled with a reservoir modeling framework or reservoir modeling frameworks where more than one reservoir may be modeled (e.g., as being within the geologic environment).

As an example, where multiple reservoirs exist, wells may extend to each of the reservoirs. As an example, deformation of a reservoir may have an impact on one or more other reservoirs in a geologic environment that includes multiple reservoirs. As an example, reservoirs may be "stacked", for example, one reservoir may be at a first depth (e.g., first depth range) and another reservoir may be at a second depth (e.g., a second depth range). A field development plan may aim to develop reservoirs separately and/or in a coordinated manner.

As an example, a simulation may generate one or more models for purposes of generating seismic data that can be utilized in one or more training datasets. As an example, such seismic data can include data that is based at least in part on acquired seismic data. For example, a model may be based at least in part on acquired seismic data where the model is modified spatially and/or temporally as to one or more structural features such that seismic data can be generated where such seismic data may optionally be utilized to augment the acquired seismic data. As mentioned, acquired seismic data and synthetic seismic data may be utilized for purposes of training one or more deep learning networks.

As an example, a method may be implemented via one or more frameworks such as, for example, the PETREL® framework, the OCEAN® framework, the VISAGE® framework, the INTERSECT® framework, the ECLIPSE® framework, the MANGROVE® framework, etc.

As an example, a geomechanics simulator may be configured to perform simulations based at least in part on finite elements, for example, via a finite element technique (e.g., a finite element method (FEM)). As an example, consider a geomechanics simulator such as the VISAGE® finite-element geomechanics simulator (e.g., of the VISAGE® framework). As an example, a method may be implemented via execution of instructions stored in memory (e.g., via one or more processors). As an example, instructions and a computing system may be considered to be a "simulator". As an example, consider the VISAGE® simulator.

As an example, a geomechanics simulator may include modules for modeling compaction and subsidence; well and completion integrity; cap-rock and fault-seal integrity; fracture behavior; thermal recovery; $CO_2$ disposal; etc.

As an example, a seismic-to-simulation framework such as the PETREL® framework, optionally in combination with the OCEAN® framework, may include features that facilitate data flows and that provide graphical user interfaces that support geomechanics simulation, configuration and results visualization.

Figure 13:
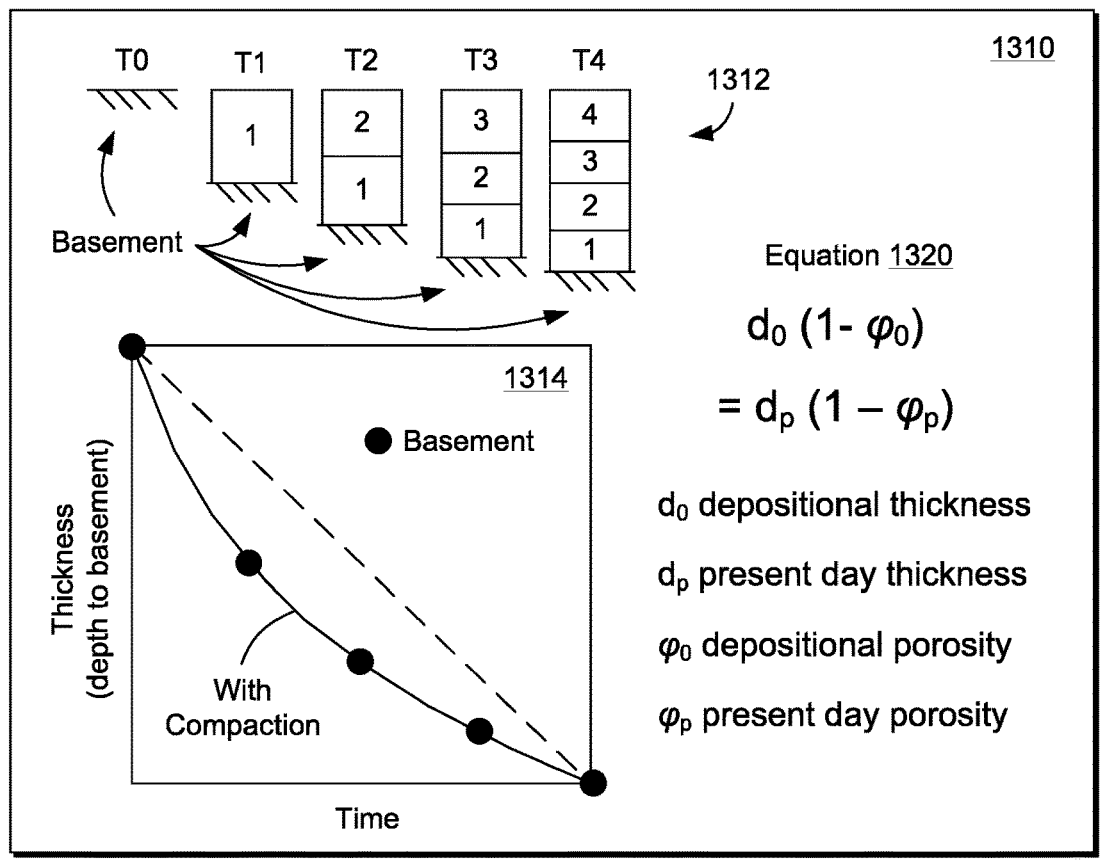
FIG. 13 illustrates an example of a method.
Figure 13:
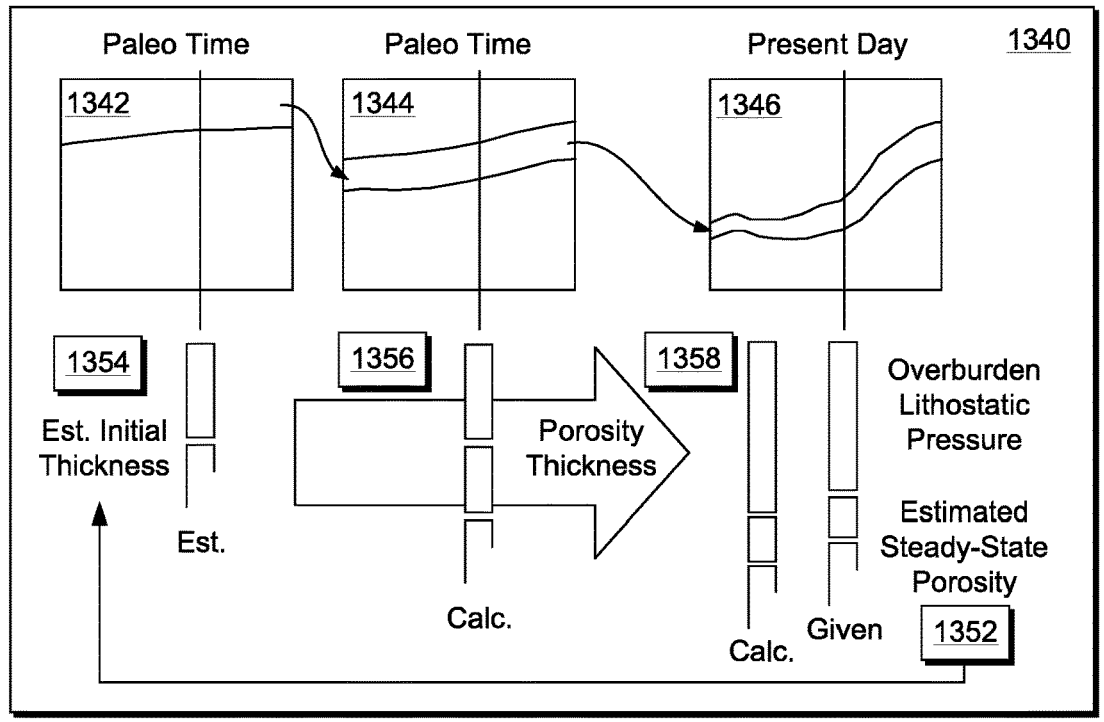

FIG. 13 shows an example of processes 1310 and 1340 that relate to backstripping and forward simulation of a multilayer sedimentary basin. Such processes may optionally implement the FEM, for example, using a finite element grid. As to backstripping, it may be referred to at times as "event stepping," for example, where paleo-geometries are reconstructed from a present day geometry due to given "geological events". As an example, a first cycle of backstripping and forward simulation may use an estimation of present day porosities (e.g., used as steady state values for hydrostatic pressure conditions) for decompaction where forward simulation yields calculated present day geometry based on pore pressure controlled compaction, for example, where the calculated present day geometry may differ from the present day geometry. In such an example, a second cycle of backstripping and forward simulation can now use calculated present day porosity for decompaction (e.g., rather than the estimated steady state values).

As to the process 1310, as shown in a graphic 1312 and a plot 1314 of thickness (e.g., depth to a basement) with respect to time, at an initial time, T0, a basement exists which defines a base level. As time progresses, the depth of the basement (e.g., the base level) will increase (e.g., for times T1, T2, T3 and T4).

As an example, the process 1310 may be part of a backstripping and forward simulation process. For example, multilayer backstripping can include observing a present day fully lithified, stratigraphic sequence that includes four compacted layers 1, 2, 3 and 4 (e.g., or "units"). At a deposition time for layer 1, layer 1 is decompacted to its original thickness and density. At a restoration time T1 for layer 1 and the basement, the basement depth in the absence of layer 1 is isostatically restored to recover its subsidence depth at the restoration time T1 (see, e.g., the basement depth at time T1 in the plot 1314). At a deposition time for layer 2, layer 2 is then decompacted to its original thickness and layer 1 is compacted according to its new depth. At a restoration time T2 for layers 1 and 2 and the basement, the decompacted layer 2 and the partially compacted layer 1 are backstripped to recover the basement subsidence depth at the restoration time T2 (see, e.g., the basement depth at time T2 in the plot 1314). The process continues for layers 3 and 4 such that the basement depth progresses deeper with respect to time, for example, as shown in the plot 1314.

In the example of FIG. 13, the plot 1314 the depth of the basement progresses in a nonlinear manner with respect to time, for example, determined in part by use of the compaction equation 1320. In such an example, each of the layers is assigned a deposition thickness and a depositional porosity at the time of deposition and, due to compaction, ultimately present day thicknesses and present day porosities result. In contrast, a straight diagonal line in the plot 1314 corresponds to sediment accumulation with respect to time without compaction. Again, as shown in the plot 1314, where compaction is taken into account for the process 1310, the basement moves nonlinearly with respect to time in response to events that deposit sediment over the basement.

As to the process 1340 of FIG. 13, plots 1342, 1344 and 1346 show examples of sediment evolution with respect to time for paleo times (e.g., historical geologic times) and for present day. As an example, the process 1340 of FIG. 13 may be described in a simplified manner with respect to blocks 1352, 1354, 1356 and 1358 as being a backstripping with decompaction and forward simulation cycle that provides calculated porosities, which, in turn, may be used in a subsequent cycle.

In the example of FIG. 13, the process 1340 includes, for present day, an estimation block 1352 that may provide an estimated steady-state porosity for a layer in a given sequence of layers of sediment (e.g., for a first cycle). Given the estimated porosities, another estimation block 1354 estimates an initial thickness for that layer where that initial thickness may be deemed to correspond to a paleo time, for example, a time at which the layer was deposited. In a forward simulation block 456, porosities and thickness are calculated and, to account for additional layers deposited in paleo time, a results block 1358 provides for calculated porosities and thicknesses (e.g., geometry) for present day. In turn, the given and the calculated information may be compared and a decision made to repeat the cycle, however, rather than using the estimated steady-state porosity (e.g., porosities), the results of the results block 1358 may be provided to enhance the initial thickness estimates per the estimates block 1354 in a subsequent cycle. Additional cycles may be performed, for example, until results given by the results block 1358 converge.

Referring again to the equation 1320, it may be used to decompact layers, for example, assuming conservation of solid matrix volume. Present day porosities may not be known a priori as they can depend on pore pressure development. Thus, when performing a first backstripping and forward simulation cycle, estimated present day porosities may be used as the steady-state values for hydrostatic pressure conditions. As an example, forward simulation can calculate present day geometry based on pore pressure controlled compaction, which may yield results that differ from the given present day geometry. As mentioned, in a subsequent cycle, the difference between calculated present day geometry and the given present day geometry will likely diminish as calculated present day porosities are provided based on decompaction, in contrast to the first cycle steady-state estimates.

As an example, erosion may also be modeled, for example, where definitions are provided for eroded thicknesses and erosion ages. As an example, eroded thicknesses may be given with virtual horizons or thicknesses at time of deposition, at present day or other geologic events. As an example, multiple erosions of one layer and one erosion on multiple layers may be recognized with virtual horizons. Interpretation of eroded thicknesses may, for example, be performed using a backstripped and decompacted paleo-geometry. In such an example, porosity at the erosion age may be considered for decompaction of overconsolidated rocks.

As an example, horizontal movements of layers like salt may be described with addition of thickness maps, for example, during doming. Such changes may be realized by layer stretching and thinning. As an example, one or more salt maps may be provided for various geologic events (e.g., based on kinematic models) that may be taken into consideration during a cycle. Where salt domes, salt pillows, etc., are modeled, high overburden may result in reverse structures. Various techniques may be applied, for example, to handle salt intrusions, for example, into one or more overburden layers.

As an example, in structural geology section restoration or palinspastic restoration, a portion of a geologic environment may be progressively undeformed, for example, in an attempt to validate an interpretation used to build a model of the portion of the geologic environment. Restoration may be used to provide insights into geometry of one or more earlier stages of geological development of a region. A palinspastic map is a map view of geological features, often also including present-day coastlines to aid the reader in recognizing an area, representing a state before deformation.

As an example, a method can include performing palinspastic (e.g., structural restoration) on one dataset and applying reverse deformation on one or more other datasets. In such an example, seismic data may be generated with associated labels for purposes of training one or more deep learning networks.

As an example, a simulation may generate one or more models for purposes of generating seismic data that can be utilized in one or more training datasets. As an example, such seismic data can include data that is based at least in part on acquired seismic data. For example, a model may be based at least in part on acquired seismic data where the model is modified spatially and/or temporally as to one or more structural features such that seismic data can be generated where such seismic data may optionally be utilized to augment the acquired seismic data. As mentioned, acquired seismic data and synthetic seismic data may be utilized for purposes of training one or more deep learning networks.

Figure 14:
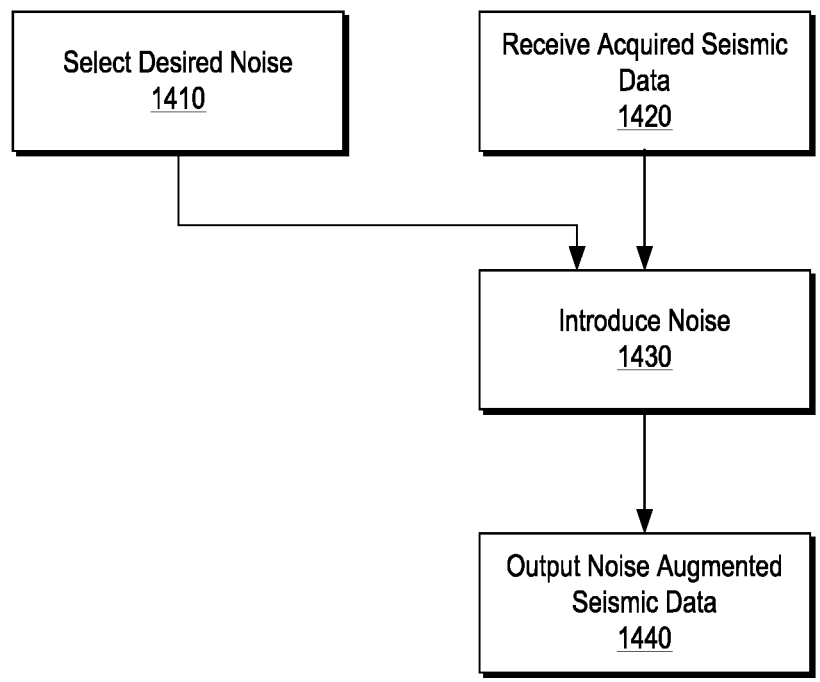
FIG. 14 illustrates an example of a method.

FIG. 14 shows an example of a method 1400 that includes a selection block 1410 for selecting desired noise; a reception block 1420 for receiving acquired seismic data; an introduction block 1430 for introducing the noise; and an output block 1440 for outputting noise augmented seismic data.

In the example of FIG. 14, the selected noise can be, for example, coherent noise, ghost noise, acquisition footprint noise, etc. As an example, noise may be noise that is extracted from one or more data sets such as one or more acquired seismic data sets and/or one or more synthetic seismic data sets.

As an example, a deep learning framework may be trained using one or more training datasets that include variations as to acquisition related noise. For example, acquisition footprint noise can be associated with acquisition geometry. As an example, a trained deep learning framework may recognize acquisition footprint noise in acquired geophysical data, which may allow for confirming one or more acquisition parameter values. For example, consider a method that includes checking a recognized acquisition footprint against acquisition geometry of a survey as a quality control metric for the deep learning framework and/or the acquisition geometry of the survey. In response, further training and/or data verification and/or cleansing may occur.

As to noise, ground roll is a type of coherent noise generated by a surface wave such as, for example, a low-velocity, low-frequency, high-amplitude Rayleigh wave. Ground roll can obscure signal and degrade overall data quality.

As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

Interference, ghosting, etc. may be considered to be sources of and/or forms of noise. As an example, interference may arise due to one or more survey parameters. For example, consider shot-to-shot interval parameter of X seconds and a record length parameter of Y seconds. In such an example, where the shot-to-shot interval parameter is less than the record length parameter (e.g., X<Y), interference may be recorded. As an example, consider a survey where X is about 12 second and where Y is about 16 seconds. In such an example, data may exhibit deep interference that is about 40 dB or more than underlying signal. As an example, a survey parameter such as a shot-to-shot interval parameter may be specified as a time and/or as a distance (e.g., consider moving equipment).

As mentioned, noise that is dealt with in processing of seismic data can be multiple associated noise. As mentioned, multiples can arise when seismic energy "bounces" back and forth between two (or more) strong reflectors (e.g., an air/water interface at the sea surface and a water/solid interface at the sea bottom in marine seismic data). Multiple reflections can clutter a desired primary reflection and, as such, may be suppressed as effectively as possible during processing. However, multiple suppressing (e.g., attenuation) processes may have limited efficiency and residual multiple energy can remain after a process is applied. As an example, synthetic seismic data may be produced with accordingly obtained residual multiple energy superimposed. Such data may be utilized as training data for a deep learning framework where knowledge of multiples can be utilized in discerning signal from noise (e.g., recognizing independently underlying primaries in the presence of multiples in acquired geophysical data processed via a framework).

As an example, a method can include processing time lapse geophysical data such as 4D seismic data. Such data can be interpreted to determine effects of production related changes to an environment. For example, as fluid is produced from a reservoir, changes may occur such that one or more layers above the reservoir become depressed as support from the fluid is lessened over time. As an example, such an effect may be modeled and perturbed to generate a plurality of realizations that may be utilized for training a deep learning framework. In such an example, the trained deep learning framework may recognize one or more types of structural changes that may be associated with one or more physical phenomena (e.g., production, injection, etc.).

As an example, a method can take a time lapse difference in one or more areas where no production related change is expected. In such an approach, a residual can be an estimate of noise that is superimposed on a seismic signal. In such an example, a trained deep learning framework may be able to estimate the noise spectrum in both time and spatial directions. Thus, noise can be directly related to an actual acquisition rather than stemming from a pure synthetic model.

As mentioned, an algorithm may provide for extraction of random 2D slices through a 3D volume (e.g., a geophysical data cube, etc.). Such an approach may, for example, extract/select vertical 2D slices; noting that a method may provide for one or more dips that can be utilized to extract/select (e.g., utilizing moderate dip angles). As an example, such an approach may be applied in a higher dimensional sense. For example, consider utilization of higher dimensional data and/or higher dimensional 3D networks or higher.

Figure 15:
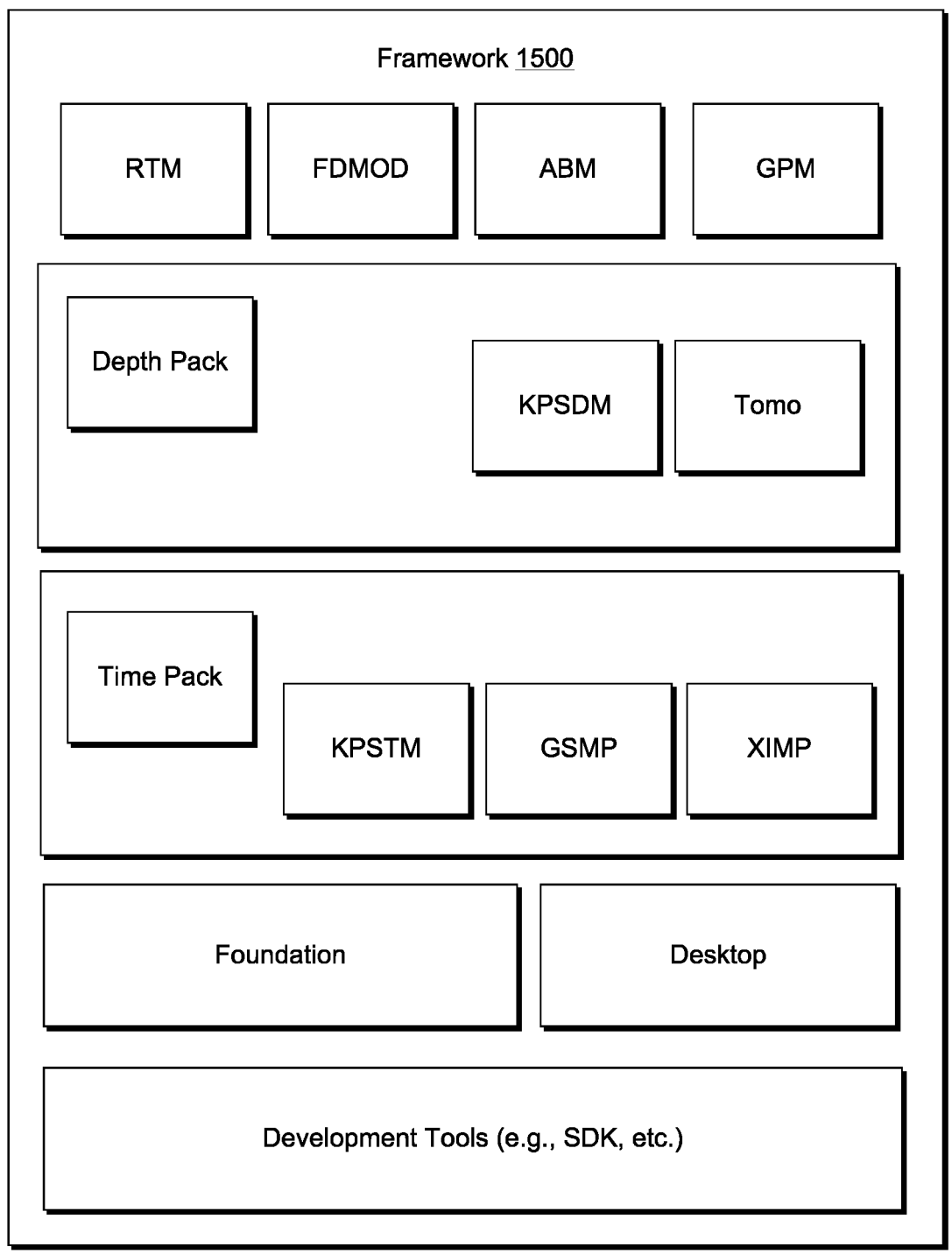
FIG. 15 illustrates an example of a framework.

FIG. 15 shows an example of a computational framework 1500 that can include one or more processors and memory, as well as, for example, one or more interfaces. The computational framework of FIG. 15 can include one or more features of the OMEGA framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 15, the computational framework 1500 includes features for RTM, FDMOD, adaptive beam migration (ABM), Gaussian packet migration (GPM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

As an example, the framework 1500 may be operatively coupled to the framework 810 of FIG. 8. For example, one or more of the algorithms 820 may be or include one or more algorithms of the framework 1500.

Figure 16:
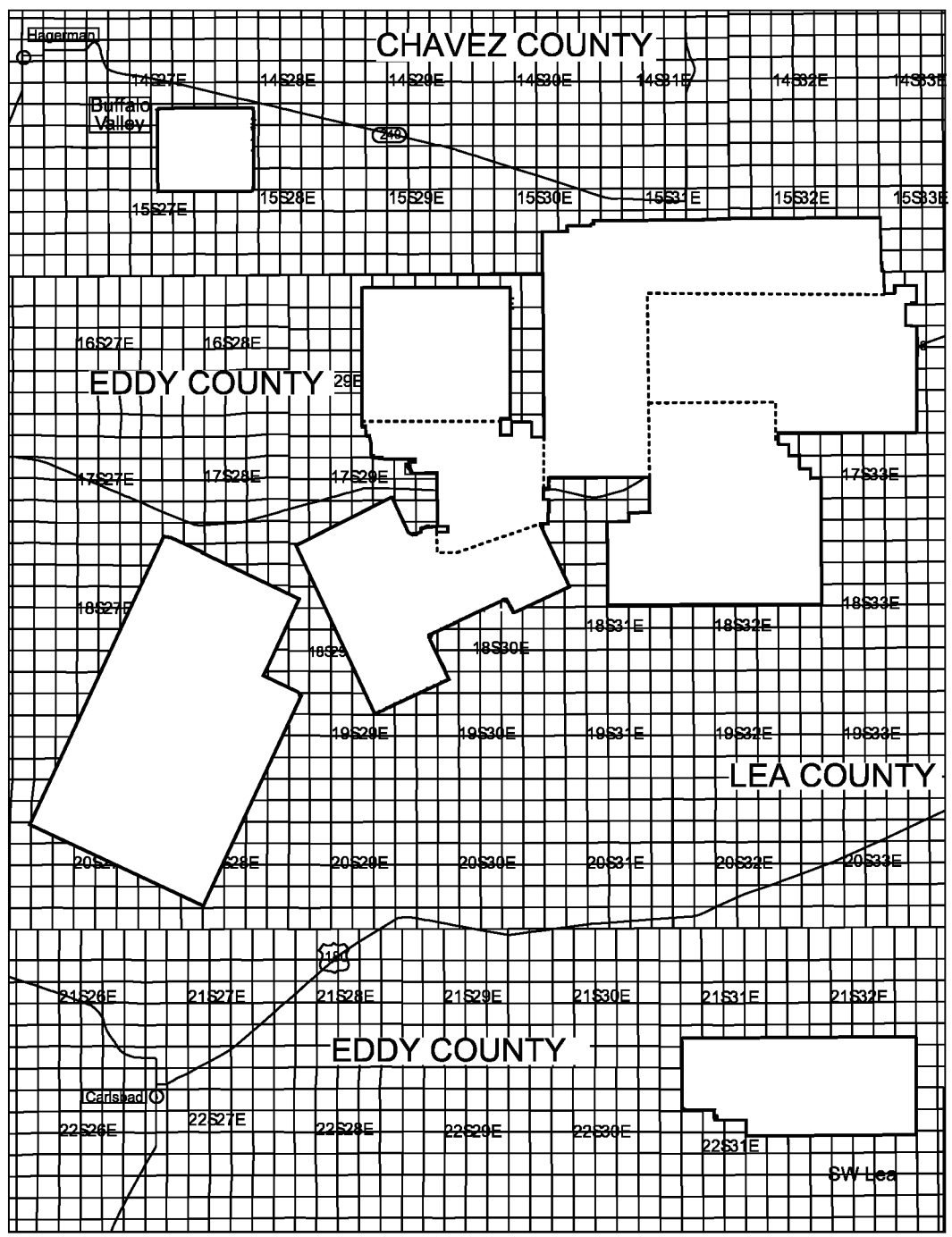
FIG. 16 illustrates an example of a map of a portion of the Grand Permian Basin.

FIG. 16 shows an example map 1600 of a portion of the Delaware Basin, which is a geologic depositional and structural basin in West Texas and southern New Mexico. The Delaware Basin includes oil fields and a fossilized reef exposed at the surface. The Delaware Basin is part of the larger Permian Basin, itself contained within the Mid-Continent oil province.

The Greater Permian Basin (GPB) is a large and structurally complex region in North America. This sedimentary basin is comprised of several sub-basins and platforms and covers an area about 250 miles wide (e.g., 400 km) and 300 miles long (e.g., 480 km) in 52 counties in west Texas and southeast New Mexico (more than 75,000 square miles or 195,000 square kilometers).

The evolution of the basin included the following three phases: (1) mass deposition (2) continental collision (3) basin filling. Before the Permian Basin was formed, the region was a broad marine area called the Tobosa Basin. During the Cambrian to Mississippian periods (541 to 323 million years ago), massive amounts of clastic sediments were deposited in the area causing it to form a depression. The defined area of the basin today began forming in late Mississippian and early Pennsylvanian (323 to 299 million years ago) when the supercontinents Laurasia and Gondwana collided to form Pangea causing faulting and uplift. While the area was covered by a seaway, episodes of faulting, uplift, and erosion (associated with the Marathon-Ouachita Orogeny) as well as different rates of subsidence caused structural deformations in the larger Tobosa Basin that divided it into sub-basins and platforms.

Latter processes that formed the GPB included filling of the sub-basins with sediments. The Midland Basin, Central Basin Platform, and the Delaware Basin are three components of the GPB. Other sections of the GPB include: the Northwest Shelf, Marfa Bain, Ozona Arch, Hovey Channel, Val Verde Basin, and Eastern Shelf.

The Midland and Delaware, as sub-basins of the GPB, share some mutual characteristics such as age and lithology, but depths, nomenclature, and development vary throughout the GPB. The sub-basins rapidly subsided, while the platform remained at a higher elevation. This resulted in areas having very different water depths and depositional environments. The basins accumulated terrigenous clastics that are associated with deep water environments, whereas coarse grains associated with shallow reef environments were deposited along the platform. Differences in sedimentary depositions and tectonics initiated stratigraphic discontinuities between the two sub-basins.

The eastern Midland Basin accumulated large amounts of clastic sediments from the Ouachita orogenic belt during the Pennsylvanian (323 to 299 million years ago). As these sediments were deposited, they formed a thick subaqueous deltaic system that consumed the basin from east to west. During the Permian period, the delta system was covered with floodplains and was nearly filled by the Middle Permian.

The western area of the GPB, the Delaware Basin, was a structural and topographical low that provided an inlet for marine water during most of the Permian. Minor sedimentation was received from the low coastal plains that surrounded the basin. While the Midland Basin was almost full of sediment by the Middle Permian, the Delaware became host to reefs built by sponges, algae, and microbial organisms. These organisms, along with the deep water inputs supplied by the Hovey Channel, promoted carbonate build-ups that formed a higher elevation area which separated the shallow water and deep water deposits.

Depth also had an impact on the way sediments were deposited in the basin. The Delaware Basin is approximately 2,000 feet deeper (e.g., 610 m) than the Midland Basin, thus causing the sediments to experience nearly twice as much pressure during burial. The foregoing is a factor in the stratigraphic discontinuities between the two sub-basins.

Referring again to FIG. 16, the map indicates regions for which data are available from surveys (see, e.g., dashed lines that delineate various surveys). For example, consider acquisition parameters as in Table 1 below:

TABLE 1

Some Examples of Acquisition Parameters and Values

| Survey Parameter | Oak Lake I | Oak Lake II | Dawson Sand |
|---|---|---|---|
| Energy source | HFVS Vibroseis | HFVS Vibroseis | Vibroseis |
| Spread geometry | 8 lines × 119 channels | 12 lines × 75 channels | 7 lines × 120 channels |
| Receiver lines | 220 ft interval (67 m): 1,760 ft spacing (536 m) | 220 ft interval (67 m): 2,200 ft spacing (670 m) | 220 ft intervals (67 m): 1,320 ft spacing (402 m) |
| Source lines | 110 ft interval (33.5 m): 1,100 ft spacing (335 m) | 210 ft interval (64 m): 1,100 ft spacing (335 m) | 220 ft intervals (67 m): 1,540 ft spacing (469 m) |
| Nominal fold | 40 | 40 | 35 |
| Cell size | 110 × 55 ft (33.5 m × 17 m) | 110 × 110 ft (33.5 m × 33.5 m) | 110 × 110 ft (33.5 m × 33.5 m) |
| Record length | 4 s | 4 s | 4 s |
| Sample rate | 2 ms | 2 ms | 2 ms |
| Survey completed | 1999 | 1999 | 1999 |

As to other survey parameters consider, as some examples, recording system (e.g., channels, etc.), sweep frequency (e.g., range, dB per octave, etc.), and sweep length (e.g., seconds). While the foregoing data are for land surveys, such data may be acquired and analysed for marine surveys, where one or more parameters may differ due to type of survey, etc.

Survey data can further be associated with one or more processing flows. For example, consider the following processing flows as applied to the data from the aforementioned Oak Lake I, II and Dawson Sand surveys: geometry merge; vibroseis minimum phase correction; spherical divergence and exponential gain correction; refraction statics; surface consistent spiking deconvolution; predictive deconvolution; first pass velocity analysis (e.g., 3,520 ft grid, 1073 m); surface consistent residual statics; DMO velocity analysis (e.g., 1,760 ft grid, 536 m); final DMO corrected stack; noise attenuation (FXY deconvolution); 3D migration; 3D coherency filtering; time variant bandpass filter; and trace amplitude balancing.

As to additional examples of processing flows, consider one or more of the following as applied to a region Emerge 1 of the map 1600 of FIG. 16: 2 ms processing sample rate; data initialization and geometry/navigation merge; amplitude recovery/trace editing; survey match; anomalous amplitude attenuation (AAA); coherent noise attenuation; refraction statics solution (Tau-P tomography); preliminary velocity analysis (e.g., 2 mile grid, 3.2 km); survey phase match and merge; surface consistent deconvolution; model based wavelet processing; surface consistent amplitude compensation; 3D residual statics (e.g., three passes); velocity analysis (e.g., 0.5 mile grid, 0.8 km); residual noise attenuation; binning/offset regularization; (KPSTM) Kirchhoff prestack time migration (e.g., 1 mile grid, 1.6 km); full isotropic, ray traced KPSTM; residual velocity analysis (e.g., 0.5 mile grid, 0.8 km); final normal moveout (NMO)/ mute/stack for full fold volume; spatial residual amplitude compensation; time variant filter; 3D KxKy filter; Monk whitening; and Tau-P coherency enhancement.

The data available for the map regions span over a decade in terms of acquisition dates. Further, as processing techniques (e.g., as implemented in processing flows) advance in time, various new processing techniques emerge, which may be applied to older data.

The examples associated with the map 1600 of FIG. 16 demonstrate some of the types of acquisition parameters and processing flows that may be utilized when acquiring and processing data from a region or regions of a basin or basins.

As mentioned, the Delaware Basin and the Midland Basin includes some commonalities and some differences while being within the Greater Permian Basin (GPB).

Figure 17:
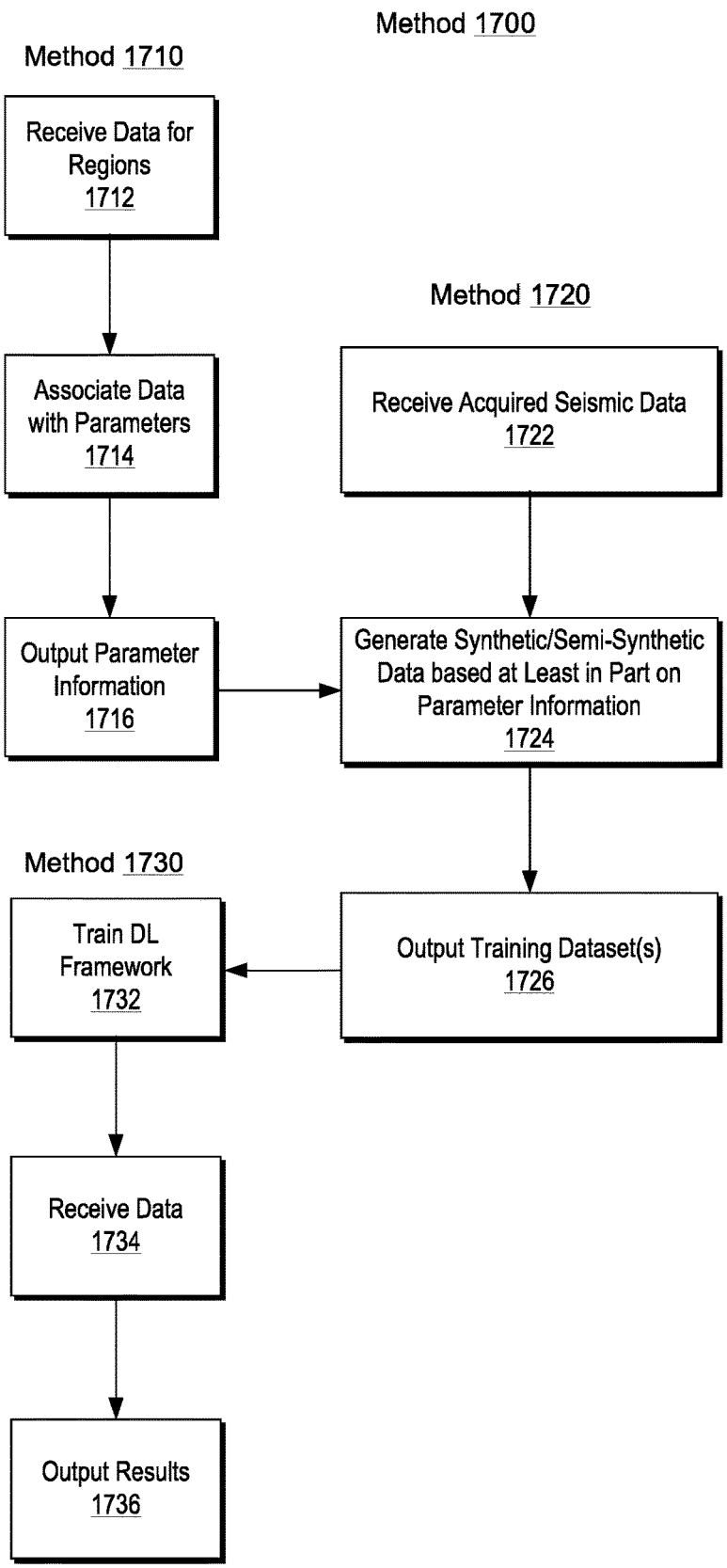
FIG. 17 illustrates an example of a method.

FIG. 17 shows an example of a method 1700 that includes example methods 1710, 1720 and 1730. As shown in FIG. 17, the method 1710 includes a reception block 1712 for receiving data for regions (e.g., multiple regions of the GPB, etc.), an association block 1714 for associating data with parameters (e.g., acquisition parameters, processing flow parameters, geology parameters, etc.), and an output block 1716 for outputting parameter information.

As shown in FIG. 17, the method 1720 include a reception block 1722 for receiving acquired seismic data (e.g., from at least one of the regions of the reception block 1712), a generation block 1724 for generating synthetic and/or semi-synthetic data based at least in part on the parameter information 1716, and an output block 1726 for outputting at least one training dataset. In such an example, one or more output training datasets may be semi-synthetic in that they are based at least in part on the seismic data received in the reception block 1722. For example, as mentioned, commonalities can exist in regions such as the Delaware Basin and the Midland Basin and differences can exist between those regions as well. A training dataset can include a portion that provides data for training a deep learning framework for common types of structural features and can include a portion that provides data for training the deep learning framework for differing types of structural features where the data as to differing types may be simulated data based at least in part on knowledge of one or more expected types of structural features. In such an example, data as to common types may exist within one or more depth ranges and data as to differing types may exist within one or more depth ranges where the depth ranges may or may not overlap, partially overlap, etc.

As mentioned, the Delaware Basin is approximately 2,000 feet deeper than the Midland Basin, thus causing the sediments to experience nearly twice as much pressure during burial in the Delaware Basin and being a basis for stratigraphic discontinuities between the two sub-basins. As an example, for two such basins (e.g., regions), some commonalities may exist at shallower depths and some differences may exist at deeper depths. Where data exist for one or both regions, data may be utilized as is and optionally in an augmented (e.g., synthetic) manner. For example, a combined training dataset may be generated based on Delaware Basin data and Midland Basin data that extends to a depth of the Delaware Basin. Such a dataset can be a training dataset in that it includes labelled features (e.g., structural features) that can be utilized to train a deep learning framework. Such a dataset can, itself, may be "unrealistic" in that it does not necessarily correspond to a particular "real" region. In such an approach, the training dataset can be used to train a deep learning framework based on features that may exist in one or both of the regions (e.g. in one of the Delaware Basin and Midland Basin or in both basins). As an example, a training dataset may be "dense" in that it includes labels for a variety of features within a definable space, which may be, in practice, unrealistic (e.g., in that fewer features exist in a real space). Such an approach may provide for training a deep learning framework to more accurately recognize and/or classify features and/or to more accurately determine that some type of feature exists and that it is not recognized (e.g., an unrecognizable feature or a multi-class feature that is not resolved, etc.).

As an example, a training dataset may be a feature and label dense dataset for a space. Such a training dataset may be robust at a particular level for purposes of recognizing features in actual data, particularly where one or more features may be obscured by one or more other features. As mentioned, illumination effects due to one feature may obscure another feature (or features). A robust training dataset may be based on a combination of actual data from different regions and/or a region that is augmented (e.g., supplemented, etc.) with synthetic data, etc.

Various approaches can provide for training datasets that provide more information than actual survey data alone. For example, referring to FIG. 16, as indicated, the survey data does not extend across the entire area of the map 1600. As such a deep learning framework that is trained utilizing the survey data alone may lack accuracy and/or robustness as to the "white" spaces where survey data do not exist. As an example, an approach that involves generating one or more training datasets based on acquisition parameters, processing parameters and/or geology parameters may fill in one or more of the "white" spaces, not necessarily in a one-to-one corresponding manner (e.g., spatial correspondence), but in a manner that enriches training of a deep learning framework beyond what could be provided by the survey data alone. In such an example, where one or more surveys are performed in one or more of the "white" spaces, such data may be input to a trained deep learning framework to recognize and/or classify one or more features therein and/or to determine that one or more features are unrecognizable, which may call for further interpretation efforts (e.g., consider seismic data interpretation, etc.).

Figure 18:
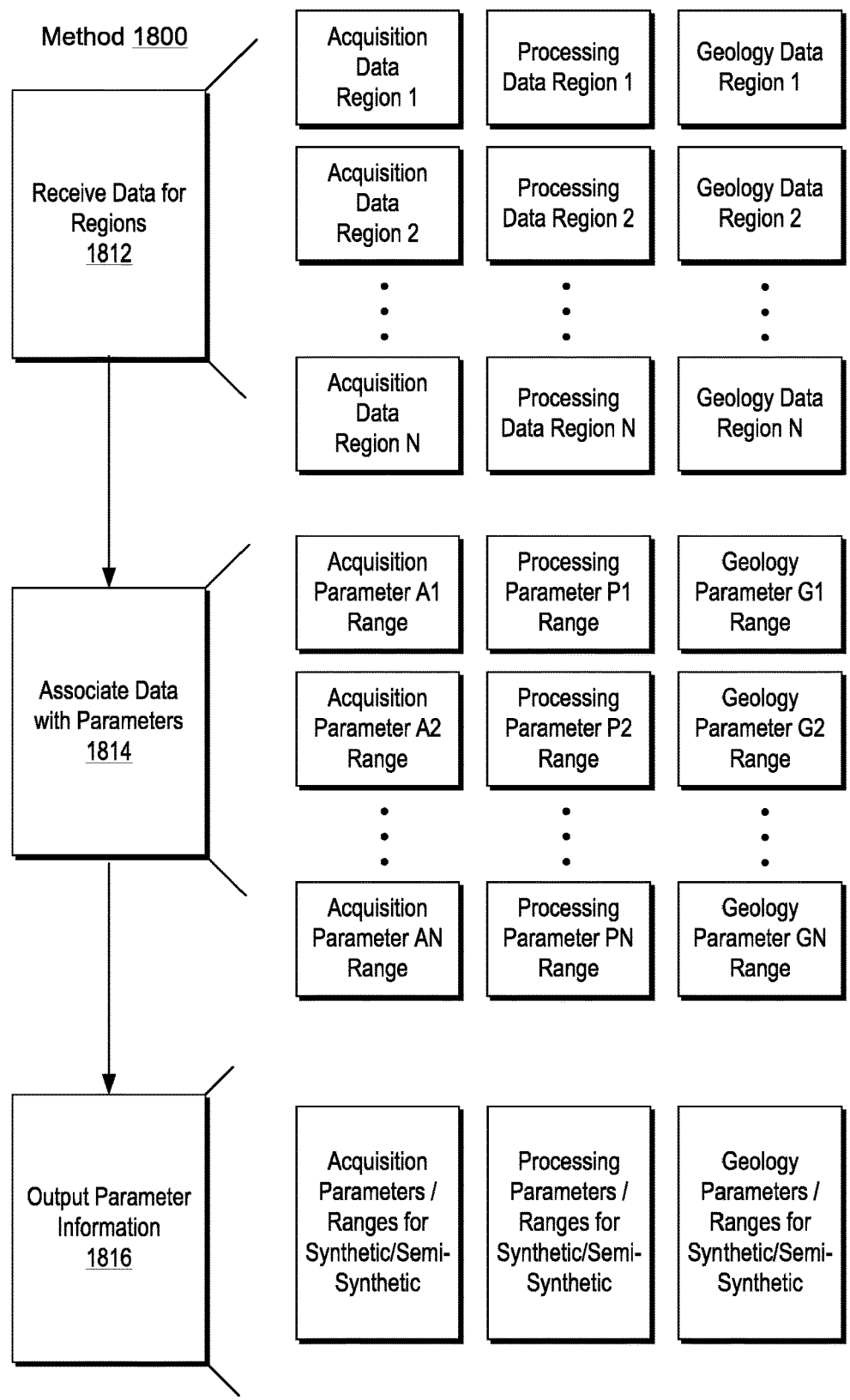
FIG. 18 illustrates an example of a method.

FIG. 18 shows an example of a method 1800 that includes a reception block 1812 for receiving data for regions, an association block 1814 for associating data with parameters and an output block 1816 for outputting parameter information. In the example of FIG. 18, the received data can include acquisition data for one or more regions, processing data for one or more regions and geology data for one or more regions. As shown in FIG. 18, the association block 1814 may determine ranges for various parameters. For example, consider an acquisition parameter for geometry or lines (see, e.g., Table 1) and consider a range or ranges that may be based on values for one or more surveys of the one or more regions and/or for a region or regions to subject to analysis via a trained deep learning framework. As shown in FIG. 18, the output block 1816 can output parameter information that can include ranges for synthetic and/or semi-synthetic data generation. As an example, a series of simulations of seismic surveys may generate synthetic data for a range of geometries, lines, sources, sweep frequencies, etc. In such simulations, structural features may exist, with or without simulation of illumination effects. As an example, a method can include combining simulation results, which may include common and/or different structural features, to generate a training dataset. As mentioned, a training dataset may be "dense" as to features therein when compared to actual data for a region.

As to acquisition parameters and/or values thereof, such parameters and/or values may operate on the level of seismic traces, which can be in a time series domain. As to processing parameters and/or values, such information may be utilized for particular data that is to be similarly processed. For example, consider generation of synthetic data that is processed with Kirchhoff prestack time migration (KPSTM) with different values for grid size. In terms of training a deep learning framework, where input data are processed with KPSTM of a known grid size, the deep learning framework may account for grid size based at least in part on training thereof using the KPSTM synthetic data for one or more grid sizes. As to processing parameters and/or values thereof for geology parameters, consider a reflector being represented by particular material (e.g., as to lithology), thickness and/or depth, where one or more of the lithology, thickness and/or depth can be varied for purposes of generating one or more training datasets. In such an example, the variations can be based at least in part on the received data for the regions per the reception block 1812. As mentioned, basins such as the Delaware Basin and Midland Basin can differ in depth, which may result in observation of more compaction for certain material(s) in depths of the Delaware Basin than in shallower depths of the Midland Basin. As an example, variations in a reflector may be simulated to generate synthetic data for such variations, which may be included in separate training datasets and/or a common training dataset.

As an example, a reflector can be an interface between layers of material that include contrasting acoustic, optical and/or electromagnetic properties. Waves of electromagnetism, heat, light and sound can be reflected at such an interface. In seismic data, a reflector might represent a change in lithology, a fault or an unconformity. In seismic data, a reflector is expressed as a reflection as can be determined via analysis of a trace or traces.

Figure 19:
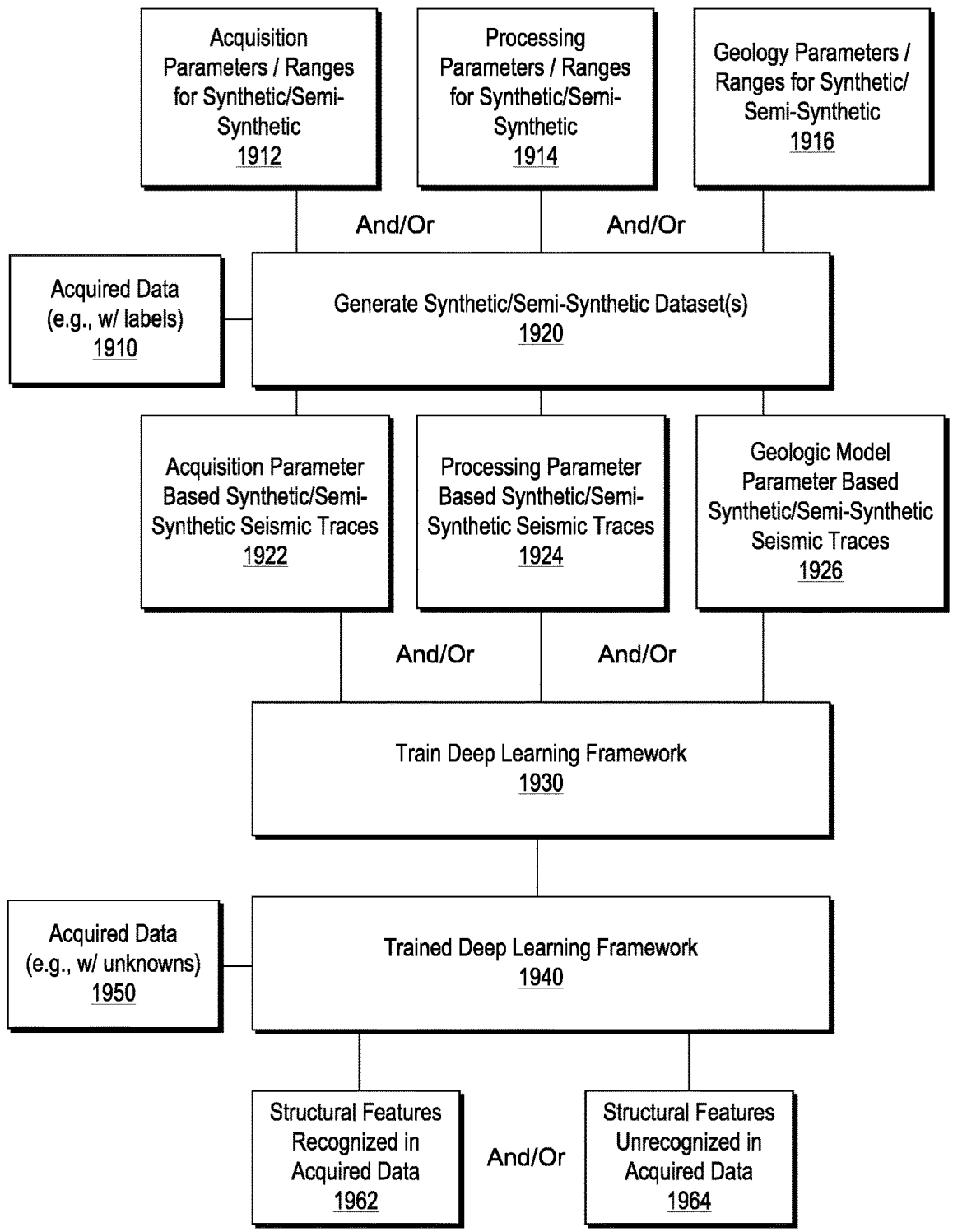
FIG. 19 illustrates an example of a method.

FIG. 19 shows an example of a method 1900 that includes an acquisition block 1910 for acquiring data that can include labels and that includes various blocks for parameters and/or values thereof acquisition 1912, processing 1914 and geology 1916. Such information can be utilized by a generation block 1920 to generate one or more synthetic and/or semi-synthetic datasets. As an example, such one or more datasets may be in the form of traces as to acquisition 1922, processing 1924 and geology 1926. As shown in FIG. 19, the one or more generated datasets can be utilized in a training block 1930 to train a deep learning framework where such a trained framework may be utilized to receive acquired data per an acquisition block 1950 where such data includes "unknowns" (e.g., as to structural features, etc.) and to output structural features recognized in the acquired data per an output block 1962 and/or to output structural features unrecognized in the acquired data per an output block 1964. As mentioned, such an approach may help to focus interpretation as to particular features that are labelled "unrecognized" based on one or more criteria (e.g., mixed class, high uncertainty, etc.). As an example, a portion of the acquired data may be loaded in a framework such as an interpretation framework (e.g., PETREL® framework, etc.) for analysis.

As an example, a deep learning framework may be trained to determine type of survey, type of processing, etc. with respect to acquired data that are input. For example, where a deep learning framework is trained based on acquisition parameters (e.g., and values) and/or processing parameters (e.g., and values), the deep learning framework may output information as to the most likely acquisition parameters (e.g., and values) and/or processing parameters (e.g., and values) utilized. Such an approach may be implemented as a quality control process that can quality control check the data and/or the training of the deep learning framework. For example, where known information as to acquisition and/or processing matches output from a trained deep learning framework, quality may be deemed adequate; however, if one or more differences occur, one or more checks may be performed to determine if the "known" information is inaccurate and/or if the deep learning framework can benefit from further training.

As an example, one or more survey designs can be modelled for purposes of generating synthetic seismic data and/or semi-synthetic seismic data. Such an approach can provide for generating one or more training datasets for a deep learning framework.

A computational framework may include one or more features of the SIMSOURCE framework. As an example, computational frameworks may be integrated, operatively coupled, etc.

As an example, a method can include selecting a type of geophysical data; selecting a type of algorithm; generating synthetic geophysical data based at least in part on the algorithm; training a deep learning framework based at least in part on the synthetic geophysical data to generate a trained deep learning framework; receiving acquired geophysical data for a geologic environment; implementing the trained deep learning framework to generate interpretation results for the acquired geophysical data; and outputting the interpretation results. In such an example, the type of geophysical data can be or include seismic data and/or can be or include log data. As an example, a type of geophysical data can be or include surface controlled electromagnetic data.

As an example, a type of algorithm can be a model modification algorithm that modifies at least a portion of a model of a geologic environment. As an example, a type of algorithm can be a filtering algorithm. For example, consider a frequency filtering algorithm, a spatial filtering algorithm or another type of filtering algorithm.

As an example, a type of algorithm can be a noise generation algorithm. For example, consider a coherent noise generation algorithm. As an example, a noise generation algorithm may extract noise from acquired data and/or generate noise utilizing a model or models. For example, extracted noise can be footprint acquisition noise, multiple noise, etc. and/or model generated noise can be footprint acquisition noise, multiple noise, etc.

As an example, a type of algorithm can be an acquisition geometry variation algorithm. For example, a base geometry may be provided (e.g., via user input, via survey parameters, etc.) and variations may be generated from the base geometry. In such an approach, one or more acquisition parameters and/or values may be varied (e.g., marine, land, etc.; see, e.g., Table 1, etc.).

As an example, a method can include combining synthetic geophysical data with at least a portion of acquired geophysical data and training a deep learning framework based at least in part on the combined geophysical data. In such an example, the trained deep learning framework can be utilized for interpretation of acquired geophysical data, as may be acquired by performing one or more surveys (e.g., marine, land, etc.).

As an example, a method can include generating synthetic geophysical data based at least in part on an algorithm that generates a plurality of sets of synthetic geophysical data where each of the sets differs with respect to an acquisition parameter value (e.g., marine, land, etc.).

As an example, a method can include generating synthetic geophysical data based at least in part on an algorithm that generates a plurality of sets of synthetic geophysical data where each of the sets differs with respect to a processing parameter value (e.g., marine, land, etc.; see, e.g., the framework 1500 of FIG. 15).

As an example, a method can include generating synthetic geophysical data based at least in part on an algorithm that generates a plurality of sets of synthetic geophysical data where each of the sets differs with respect to a geology parameter value (see, e.g., FIGS. 11, 12, 13, etc.).

As an example, a system can include a processor; memory operatively coupled to the processor; and processor-executable instructions stored in the memory to instruct the system to: select a type of geophysical data; select a type of algorithm; generate synthetic geophysical data based at least in part on the algorithm; train a deep learning framework based at least in part on the synthetic geophysical data to generate a trained deep learning framework; receive acquired geophysical data for a geologic environment; implement the trained deep learning framework to generate interpretation results for the acquired geophysical data; and output the interpretation results. As an example, a type of geophysical data can be or include seismic data and/or a type of geophysical data can be or include log data. As an example, a system can include an interface that outputs at least one control signal based at least in part on interpretation results. For example, where interpretation results indicates that hydrocarbons (e.g., pay) exists in a geologic environment, a control signal may be issued to one or more pieces of drilling equipment and/or one or more other pieces of equipment where such a control signal can cause a field or other operation to reach, produce, etc., at least a portion of the hydrocarbons.

As an example, one or more computer-readable storage media can include processor-executable instructions to instruct a computing system to: select a type of geophysical data; select a type of algorithm; generate synthetic geophysical data based at least in part on the algorithm; train a deep learning framework based at least in part on the synthetic geophysical data to generate a trained deep learning framework; receive acquired geophysical data for a geologic environment; implement the trained deep learning framework to generate interpretation results for the acquired geophysical data; and output the interpretation results.

As an example, a system may include one or more sets of instructions, which may be provided to analyze data, control a process, perform a task, perform a workstep, perform a workflow, etc.

Figure 20:
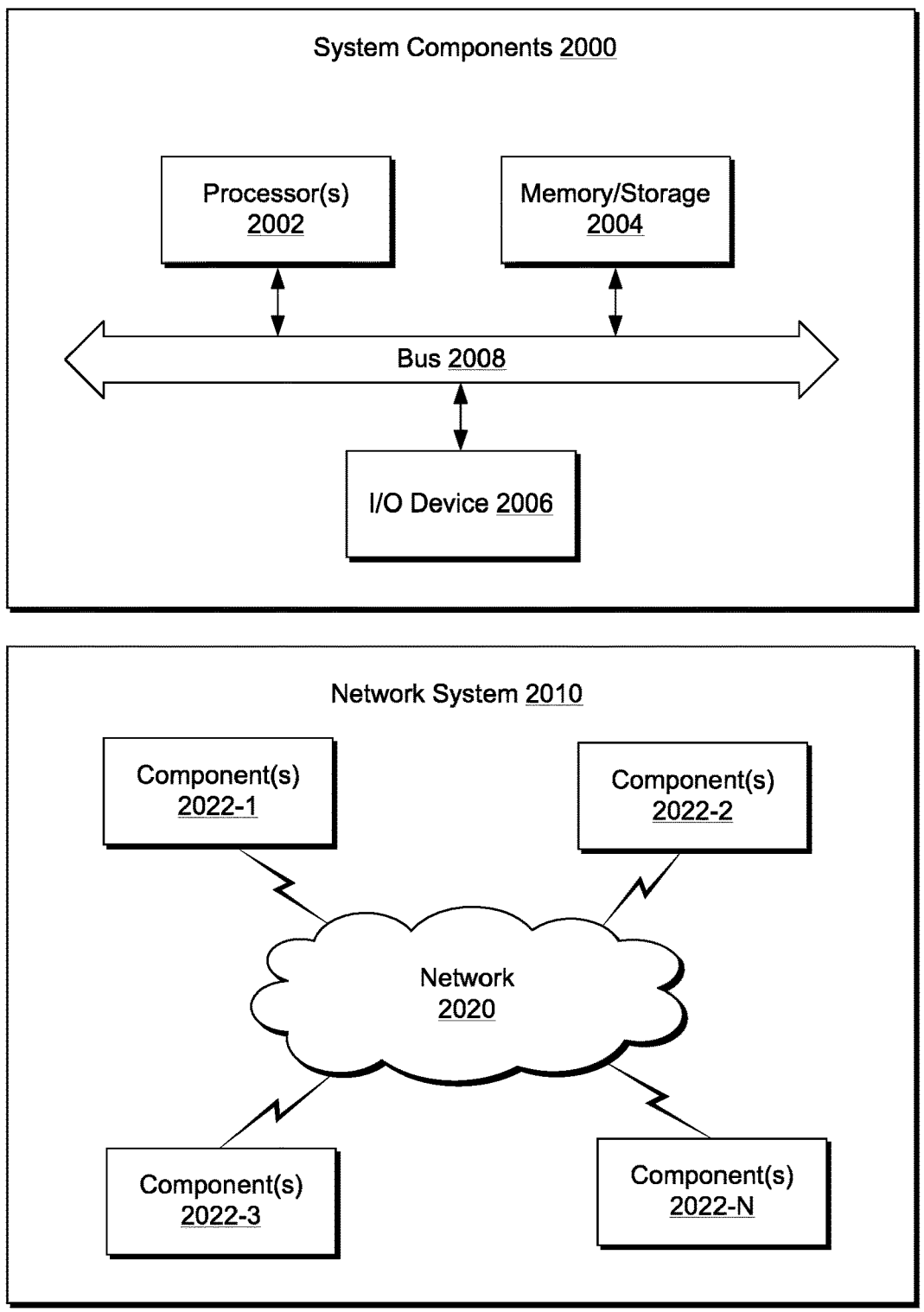
FIG. 20 illustrates example components of a system and a networked system.

FIG. 20 shows components of an example of a computing system 2000 and an example of a networked system 2010. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    selecting a type of geophysical data;
    selecting a type of algorithm;
    generating synthetic geophysical data of the selected type of geophysical data based at least in part on the algorithm;
    training a deep learning classifier framework based at least in part on the synthetic geophysical data to generate a trained deep learning classifier framework;
    receiving acquired geophysical data for a geologic environment;
    implementing the trained deep learning classifier framework to generate interpretation results for the acquired geophysical data; and
    outputting the interpretation results, wherein the interpretation results characterize structural features indicative of hydrocarbons in the geologic environment.

2. The method of claim 1 wherein the type of geophysical data comprises seismic trace data.

3. The method of claim 1 wherein the type of geophysical data comprises log data acquired via a downhole tool.

4. The method of claim 1 wherein the type of geophysical data comprises surface controlled electromagnetic data.

5. The method of claim 1 wherein the type of algorithm comprises a model modification algorithm that randomly modifies at least a portion of a model of the geologic environment within a predefined set of parameters for generating one or more portions of the synthetic geophysical data.

6. The method of claim 1 wherein the type of algorithm comprises a filtering algorithm.

7. The method of claim 6 wherein the filtering algorithm comprises a frequency-domain filtering algorithm or a time-domain filtering algorithm and wherein the type of geophysical data comprises seismic trace data, wherein the frequency-domain filtering algorithm comprises performing a Fourier transform on a seismic trace to output an amplitude spectrum, multiplying the amplitude spectrum by an amplitude spectrum of a filter operator to generate a result and performing an inverse Fourier transform on the result to output a filtered seismic trace as a portion of the synthetic geophysical data, and wherein the time-domain filtering algorithm comprises performing an inverse Fourier transform on an amplitude spectrum to generate a filter operator and convolving the filter operator with a seismic trace to output a filtered seismic trace as a portion of the synthetic geophysical data.

8. The method of claim 6 wherein the filtering algorithm comprises a spatial filtering algorithm.

9. The method of claim 1 wherein the type of algorithm comprises a noise generation algorithm.

10. The method of claim 9 wherein the type of geophysical data comprise seismic trace data, wherein the noise generation algorithm comprises a coherent noise generation algorithm that generates synthetic coherent noise or that extracts coherent noise from real seismic trace data acquired via a seismic survey.

11. The method of claim 1 wherein the type of geophysical data comprise seismic trace data, wherein the type of algorithm comprises an acquisition geometry variation algorithm that perturbs an acquisition geometry of a seismic survey to generate one or more perturbed acquisition geometries, wherein the generating synthetic geophysical data comprises simulating seismic trace data with the one or more perturbed acquisition geometries.

12. The method of claim 1 comprising combining the synthetic geophysical data with at least a portion of the acquired geophysical data and training the deep learning framework based at least in part on the combined geophysical data.

13. The method of claim 1 wherein generating synthetic geophysical data based at least in part on the algorithm generates a plurality of sets of synthetic geophysical data wherein each of the sets differs with respect to an acquisition parameter value.

14. The method of claim 1 wherein generating synthetic geophysical data based at least in part on the algorithm generates a plurality of sets of synthetic geophysical data wherein each of the sets differs with respect to a processing parameter value.

15. The method of claim 1 wherein generating synthetic geophysical data based at least in part on the algorithm generates a plurality of sets of synthetic geophysical data wherein each of the sets differs with respect to a geology parameter value.

16. A system comprising:
a processor;
memory operatively coupled to the processor; and
processor-executable instructions stored in the memory to instruct the system to:
select a type of geophysical data;
select a type of algorithm;
generate synthetic geophysical data of the selected type of geophysical data based at least in part on the algorithm;
train a deep learning classifier framework based at least in part on the synthetic geophysical data to generate a trained deep learning classifier framework;
receive acquired geophysical data for a geologic environment;
implement the trained deep learning classifier framework to generate interpretation results for the acquired geophysical data; and
output the interpretation results, wherein the interpretation results characterize structural features indicative of hydrocarbons in the geologic environment.

17. The system of claim 16 wherein the type of geophysical data comprises seismic trace data.

18. The system of claim 16 wherein the type of geophysical data comprises log data.

19. The system of claim 16 comprising an interface that outputs at least one control signal based at least in part on the interpretation results.

20. One or more non-transitory computer-readable storage media comprising processor-executable instructions to instruct a computing system to:
select a type of geophysical data;
select a type of algorithm;
generate synthetic geophysical data of the selected type of geophysical data based at least in part on the algorithm;
train a deep learning classifier framework based at least in part on the synthetic geophysical data to generate a trained deep learning classifier framework;
receive acquired geophysical data for a geologic environment;
implement the trained deep learning classifier framework to generate interpretation results for the acquired geophysical data; and
output the interpretation results, wherein the interpretation results characterize structural features indicative of hydrocarbons in the geologic environment.

* * * * *